(12) United States Patent
Nomura et al.

(10) Patent No.: US 6,786,790 B2
(45) Date of Patent: Sep. 7, 2004

(54) METHOD AND APPARATUS FOR MANUFACTURING OPTICAL RESIN SUBSTRATE, METHOD AND APPARATUS FOR MANUFACTURING LIQUID CRYSTAL DISPLAY ELEMENT USING IT, AND LIQUID CRYSTAL DISPLAY DEVICE USING IT

(75) Inventors: Takaiki Nomura, Osaka (JP); Hiroshi Satani, Kyoto (JP); Naomi Kaneko, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 9 days.

(21) Appl. No.: 10/116,114

(22) Filed: Apr. 5, 2002

(65) Prior Publication Data

US 2002/0164916 A1 Nov. 7, 2002

(30) Foreign Application Priority Data

Apr. 5, 2001 (JP) .................................... 2001-106732
Apr. 9, 2001 (JP) .................................... 2001-109600

(51) Int. Cl.$^7$ ................................................. H01J 9/02
(52) U.S. Cl. ........................... 445/25; 445/24; 349/187
(58) Field of Search .................... 445/24, 25; 349/187, 349/192

(56) References Cited

U.S. PATENT DOCUMENTS

| | | | | |
|---|---|---|---|---|
| 4,697,885 A | * | 10/1987 | Minowa et al. | 349/149 |
| 4,715,686 A | * | 12/1987 | Iwashita et al. | 349/137 |
| 4,743,099 A | * | 5/1988 | Dickerson et al. | 349/162 |
| 5,313,322 A | * | 5/1994 | Takanashi et al. | 349/187 |
| 5,508,134 A | * | 4/1996 | Shirai | 430/20 |
| 5,664,982 A | * | 9/1997 | Nakano et al. | 445/24 |
| 5,687,465 A | * | 11/1997 | Hinata et al. | 29/402.01 |
| 5,828,435 A | * | 10/1998 | Kato et al. | 349/190 |
| 6,118,512 A | * | 9/2000 | Sakaigawa et al. | 349/166 |
| 6,151,096 A | * | 11/2000 | McDonnell et al. | 349/188 |
| 6,304,311 B1 | * | 10/2001 | Egami et al. | 349/189 |
| 6,333,770 B1 | * | 12/2001 | Omae et al. | 349/86 |
| 6,335,717 B2 | * | 1/2002 | Hasegawa et al. | 345/97 |

FOREIGN PATENT DOCUMENTS

| | | |
|---|---|---|
| JP | 2-226530 | 9/1990 |
| JP | 09-146080 | 6/1997 |
| JP | 10-206835 | 8/1998 |

* cited by examiner

Primary Examiner—Nimeshkumar D. Patel
Assistant Examiner—Dalei Dong
(74) Attorney, Agent, or Firm—McDermott Will & Emery LLP

(57) ABSTRACT

A method for manufacturing an image display element having a resin substrate that holds a display functional portion on which images are displayed, having: an inorganic film forming step of forming inorganic films on both surfaces of the resin substrate, and a dehydration step of dehydrating the resin substrate before or after the inorganic film forming step, wherein the resin substrate subjected to the inorganic film forming step and the dehydration step and an other substrate are bonded to each other by a sealing material, and then the sealing material is cured by heating at least the resin substrate.

24 Claims, 20 Drawing Sheets

|  | OPPOSING SUBSTRATE | COLOR FILTER SUBSTRATE | PATTERN MISALIGNMENT | APERTURE RATIO |
|---|---|---|---|---|
| LIQUID CRYSTAL DISPLAY ELEMENT I | 100.0007mm | 100.0002mm | 0.5 $\mu$m | 99.3% |
| LIQUID CRYSTAL DISPLAY ELEMENT K | 99.9964mm | 99.9922mm | 4.2 $\mu$m | 94.4% |

Fig. 9

| | OPPOSING SUBSTRATE | FLEXIBLE TERMINAL | PATTERN MISALIGNMENT | CONTACT RATIO |
|---|---|---|---|---|
| LIQUID CRYSTAL DISPLAY ELEMENT I | 100.0007mm | 100.0005mm | 0.2 μm | 99.7% |
| LIQUID CRYSTAL DISPLAY ELEMENT K | 99.9964mm | 100.0005mm | 4.1 μm | 94.4% |

Fig. 10

|  | COLOR FILTER SUBSTRATE | FLEXIBLE TERMINAL | PATTERN MISALIGNMENT | CONTACT RATIO |
|---|---|---|---|---|
| LIQUID CRYSTAL DISPLAY ELEMENT I | 100.0002mm | 100.0005mm | 0.3 $\mu$m | 95.4% |
| LIQUID CRYSTAL DISPLAY ELEMENT K | 99.9961mm | 100.0005mm | 4.4 $\mu$m | 94.1% |

Fig. 11

|  | COLOR FILTER SUBSTRATE | FLEXIBLE TERMINAL | PATTERN MISALIGNMENT | APERTURE RATIO |
| --- | --- | --- | --- | --- |
| LIQUID CRYSTAL DISPLAY ELEMENT α | 100.0007mm | 100.0002mm | 0.5 μm | 99.5% |
| LIQUID CRYSTAL DISPLAY ELEMENT β | 100.0008mm | 100.0152mm | 14.4 μm | 83.6% |

Fig. 17

|  | OPPOSING SUBSTRATE | FLEXIBLE TERMINAL | PATTERN MISALIGNMENT | CONTACT RATIO |
| --- | --- | --- | --- | --- |
| LIQUID CRYSTAL DISPLAY ELEMENT I | 100.0007mm | 100.0005mm | 0.2 $\mu$m | 100% |
| LIQUID CRYSTAL DISPLAY ELEMENT K | 100.0152mm | 100.0005mm | 14.7 $\mu$m | 77.9% |

Fig. 18

METHOD AND APPARATUS FOR MANUFACTURING OPTICAL RESIN SUBSTRATE, METHOD AND APPARATUS FOR MANUFACTURING LIQUID CRYSTAL DISPLAY ELEMENT USING IT, AND LIQUID CRYSTAL DISPLAY DEVICE USING IT

FIELD OF THE INVENTION

The present invention relates to a method for manufacturing an image display element used in televisions and flat panel displays on which computer images are displayed. More particularly, the present invention relates to a method for manufacturing an image display element using a resin substrate.

DESCRIPTION OF RELATED ART

Conventionally, in liquid crystal panels (liquid crystal display elements) that use a resin substrate, the resin substrate undergoes significant dimensional change with variations in absorption of moisture into the resin substrate and in ambient temperatures. Thus, dimensions of an etching pattern of ITO (indium tin oxide) electrodes and a CF (color filter) pattern, for example, may be wildly different from an actual dimension. Similar problems occur when an array substrate and an opposing substrate are bonded together. An electrode pattern and a color filter pattern tend not to match with each other between the bonded substrates. Consequently, the size of a pixel (aperture ratio) varies. This affects on display characteristics such as contrast.

As an approach to solve the above-mentioned problems, Japanese Patent Laid-open No. 9-146080 disclose a technique in which a gas barrier film is disposed on a resin substrate to prevent any gases from infiltrating into a liquid crystal and the dimensional change caused by the absorption of moisture is suppressed as a side effect of the gas barrier film. Typical gas barrier films include $SiO_x$ films and $SiN_x$ films.

However, the resin substrate having the gas barrier film cannot completely avoid the absorption of moisture. It was found that the substrate undergoes no rapid dimensional change when it is left at a room temperature, but undergoes significant dimensional change before and after heating of the substrate. This means that the resin substrate would undergo significant dimensional change even when it has a gas barrier film because a process for manufacturing liquid crystal panels involves repeated heating steps. To solve this problem has been a big challenge.

SUMMARY OF THE INVENTION

The present invention was made to solve the above-mentioned problems, and an object thereof is to provide a method for manufacturing an image display element of which resin substrate undergoes less dimensional change.

In order to achieve the object, the present inventor observed dimensional behaviors of resin substrates thoroughly. As a result, it was revealed that change in water absorption into the resin substrate during repeated heating is responsible for the dimensional change due to the repeated heating of the resin substrate.

Therefore, a method for manufacturing an image display device according to the present invention is a method for manufacturing an image display element having a resin substrate that holds a display functional portion on which images are displayed, characterized by comprising: an inorganic film forming step of forming inorganic films on both surfaces of the resin substrate, and a dehydration step of dehydrating the resin substrate before or after the inorganic film forming step, wherein the resin substrate subjected to the inorganic film forming step and the dehydration step and an other substrate are bonded to each other by a sealing material, and then the sealing material is cured by heating at least the resin substrate. With this configuration, the water absorption into the resin substrate is reduced. The resin substrate is covered with the inorganic films on both surfaces thereof, so that the water absorption into the resin substrate is kept at the reduced level after a relatively long period of time. Consequently, variation in water absorption is small when the resin substrate is subjected to heating in subsequent steps of manufacturing the image display element. The dimensional change of the resin substrate is small accordingly.

The display functional portion may be interposed between the resin substrate and the other substrate.

In addition, the other substrate may has a color filter. Furthermore, the color filter may comprise subfilters which are color filters corresponding to red, green and blue.

The color filter may be adapted to selectively pass a light having predetermined wave length included in incident white light therethrough.

The resin substrate may be dehydrated in the dehydration step so that the water absorption is 0.5% or less by weight. With this configuration, the resin substrate having water absorption of 0.5% or less by weight is in chemical absorption of moisture rather than in physical absorption of water. Absorption and removal of water occur less frequently at a relatively high temperature and the dimensional change is much smaller accordingly.

The inorganic film forming step may be carried out after the dehydration step.

The dehydration step may be carried out after the inorganic film forming step.

The resin substrate may be formed of, at least one of epoxy, acryl, polyimide, polycarbonate, polyvinyl alcohol, and polyethylene, composites thereof, or laminated resin materials thereof. This configuration provides good optical properties because of transparency of the resin and provides good reproducibility in water absorption and dimension due to the repeated heating.

The inorganic film may comprise a film of any one of $SiO_x$, $SiN_x$, $GeO_x$, $TiO_x$, and $ZrO_x$, a composite film thereof or a laminated film thereof.

The inorganic film may have a film thickness between 15 nm and 40 nm both inclusive. With this configuration, the water absorption is kept at the reduced level for a long period of time, without any crack produced in the inorganic film.

The resin substrate may be dehydrated by means of heating. With this configuration, the water absorption into the resin substrate can be reduced easily in a highly reproducible manner.

A temperature during the heating may be 200° C. or less. With this configuration, it is possible to keep the reproducibility of the water absorption and the dimension (properties of the resin) due to the repeated heating because the resin undergoes less thermal variation.

The resin substrate may be dehydrated by pressure reduction. With this configuration, the water absorption into the resin substrate can be reduced easily in a highly reproducible manner. Moreover, it is possible to keep the reproducibility of the water absorption and the dimension due to the repeated heating because the resin undergoes less thermal variation.

The resin substrate may be heated after the pressure reduction of the resin substrate. With this configuration, the resin substrate is filled with gases in place of impurities such as water. Such gases are less prone to be absorbed and released. The dimensional change of the resin substrate due to the repeated heating is significantly small accordingly.

A temperature during the heating may be 200° C. or less. With this configuration, it is possible to keep the reproducibility of the water absorption and the dimension due to the repeated heating because the resin undergoes less thermal variation.

An atmosphere of the heating may be an inert gas. With this configuration, oxidative degradation of the resin can be avoided.

An atmosphere of the heating may be air. With this configuration, the resin substrate is filled with air in place of impurities such as water. Absorption and release of air do not change the composition thereof. Thus, the dimensional change of the resin substrate due to the repeated heating is significantly small accordingly.

A humidity of the atmosphere of the heating may be 35% or less. With this configuration, the dimensional change of the resin substrate due to the repeated heating is significantly small accordingly.

A predetermined film may be formed on one of the inorganic films of the resin substrate and the predetermined film may be patterned after the resin substrate is subjected to the inorganic film forming step and the dehydration step. With this configuration, the predetermined film is formed and patterned on the resin substrate that undergoes less dimensional change due to the repeated heating. Therefore, the dimensional change of the patterns in the predetermined film is significantly small even after the repeated heating in subsequent steps of manufacturing the image display element.

The predetermined film may be a transparent electrode film. With this configuration, the dimensional change of the transparent electrode due to the repeated heating is small.

The predetermined film may be a color filter film. With this configuration, the dimensional change of the color filter due to the repeated heating is small.

The image display element may be a liquid crystal display element, the liquid crystal display element may has the resin substrate as the other substrate, and patterns of the predetermined film may be formed on the resin substrate. With this configuration, the resin substrates that undergo less dimensional change due to the repeated heating are bonded together. Accordingly, less misalignment of the patterns occurs between the bonded resin substrates.

In addition, flexible terminals may be adhered to the transparent electrode formed by means of patterning the transparent electrode film. With this configuration, dimensional change due to the repeated heating of the resin substrate is small. Accordingly, less misalignment of the patterns occurs between the transparent electrode and the flexible terminals.

Furthermore, a method for manufacturing an image display element according to the present invention is a method for manufacturing an image display device having a resin substrate that holds a display functional portion on which images are displayed, the method comprising a reset step of dehydrating the resin substrate so that the water absorption thereof is 0.5% or less by weight. With this configuration, the resin substrate is shrinked to the limit in the reset step. Subsequently, the dimensional change of the resin substrate from the reset step to a predetermined processing step can be estimated based on the resin substrate that is shrinked to the limit, by means of manufacturing the image display element in an atmosphere maintained under predetermined conditions. Thus, the processing can be carried out with high dimensional accuracy by performing the processing such as patterning in prospect of the dimensional change in the predetermined processing step.

An inorganic film forming step of forming inorganic films on both surfaces of the resin substrate may be provided before the reset step. With this configuration, the dimensional change of the resin substrate is small after steps from the reset step to the predetermined processing step. Accuracy of estimating the change would be improved, which allows processing with higher accuracy.

These object as well as other objects, features and advantages of the invention will become apparent to those skilled in the art from the following description with reference to the accompanying drawings.

BRIEF DESCRIPTION OF THE DRAWINGS

FIGS. 3a, 3b are views illustrating a dehydration processing step in FIG. 2, in which FIG. 3a is a view corresponding to the case where a dehydration step precedes an inorganic film forming step, while FIG. 3b is a view corresponding to the case where the inorganic film forming step precedes the dehydration step in FIG. 2;

FIG. 9 is a table showing an amount of pattern misalignment between an opposing substrate and a color filter substrate of liquid crystal display elements I and K, as well as an aperture ratio of the elements;

FIG. 10 is a table showing an amount of pattern misalignment between signal electrodes on an opposing substrate and flexible terminals of the liquid crystal display elements I and K, as well as a contact ratio of the elements.

FIG. 11 is a table showing an amount of pattern misalignment between scanning electrodes on a color filter substrate and flexible terminals of the liquid crystal display elements I and K, as well as a contact ratio of the elements.

FIG. 17 is a table showing an amount of pattern misalignment between an opposing substrate and a color filter substrate of liquid crystal display elements α and β, as well as an aperture ratio of the elements;

FIG. 18 is a table showing an amount of pattern misalignment between signal electrodes on an opposing substrate and flexible terminals of the liquid crystal display elements α and β, as well as a contact ratio of the elements.

DETAILED DESCRIPTION OF THE PREFERRED EMBODIMENTS

An embodiment of the present invention is described below with reference to the drawings.
Embodiment 1

The Embodiment 1 of the present invention mainly illustrates a case where a resin substrate is heated as a dehydration processing.

Figure 1:
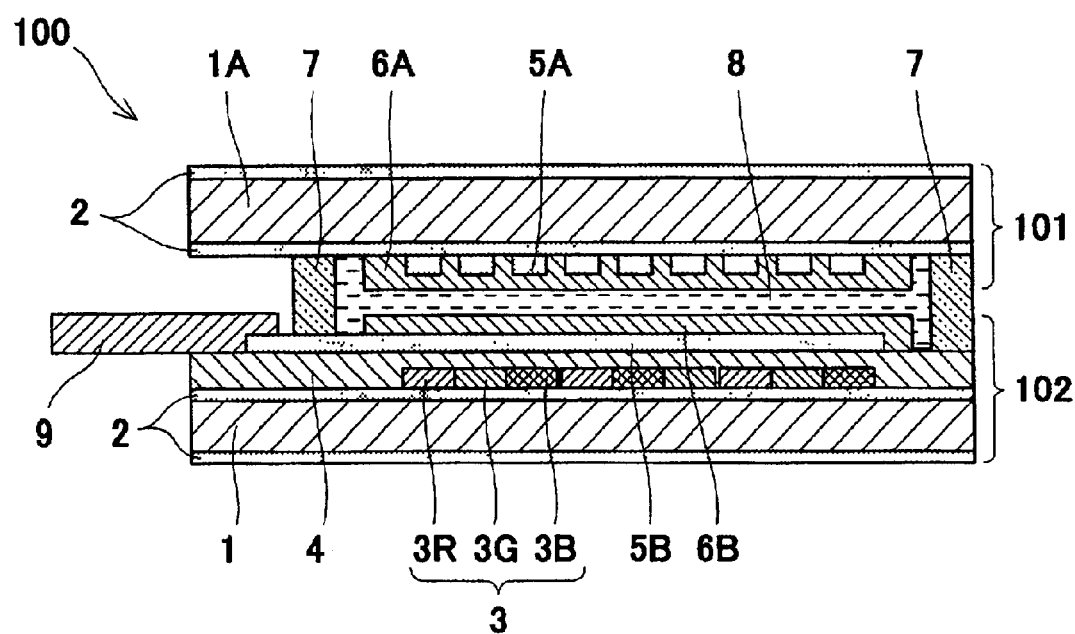
FIG. 1 is a schematic cross-sectional view showing a configuration of an image display element manufactured using a method for manufacturing an image display element according to the Embodiment 1 of the present invention.

FIG. 1 is a schematic cross-sectional view showing a configuration of an image display element manufactured using a method for manufacturing an image display element according to this embodiment.

In FIG. 1, an image display device 100 is a passive matrix liquid crystal display element (liquid crystal panel) in this embodiment. The liquid crystal display element 100 comprises a signal electrode substrate (hereinafter, referred to as an "opposing substrate") 101 and a scanning electrode substrate (hereinafter, referred to as a "color filter substrate") 102. The opposing substrate 101 and the color filter substrate 102 are opposed to each other through spacers that are not shown. Peripheries of these substrates are bonded to each other by a sealing material 7. A gap between the opposing substrate 101 and the color filter substrate 102 is filled with liquid crystal 8 and is sealed. Polarizers (not shown) are provided outside the opposing substrate 101 and the color filter substrate 102.

The opposing substrate 101 has a transparent resin substrate 1A. Transparent inorganic films 2 are formed on both outer and inner main surfaces of the resin substrate 1A. A plurality of transparent signal electrodes 5A are formed in a striped pattern on the inner inorganic film 2 and a transparent alignment layer 6A covers the signal electrodes 5A. The transparent signal electrodes are each formed of ITO. The color filter substrate 102 has a transparent resin substrate 1B. The transparent inorganic films 2 are formed on both outer and inner main surfaces of the resin substrate 1B. Color filters 3 are formed on the inner inorganic film 2. Each color filter 3 is configured with multiple sets of three striped color filters (hereinafter, referred to as sub-filters) 3R, 3G, and 3B corresponding to three colors of R (red), G (green), and B (blue), respectively. A flattening layer 4 is formed on the above-mentioned inorganic film 2 so that the flattening layer 4 covers the color filters 3. A plurality of transparent scanning electrodes 5B are formed in a striped pattern on the flattening layer 4 and a transparent alignment layer 6B covers the signal electrodes 5B. The transparent scanning electrodes are each formed of ITO. Thus, the liquid crystal 8 generally contacts with the opposing substrate 101 and the color filter substrate 102 by the alignment layers 6A and 6B. The signal electrodes 5A on the opposing substrate 101 are perpendicular to the scanning electrodes 5B on the color filter substrate 102 when viewed in plan. In addition, the sub-filters 3R, 3G, and 3B are in parallel to the corresponding signal electrodes 5B and cover them when viewed in plan. With this configuration, portions at which the signal electrodes 5A and the scanning electrodes intersect form pixels corresponding to each color.

Flexible terminals 9 are connected to each of the signal electrodes 5A and the scanning electrodes 5B. In FIG. 1, only one flexible terminal 9 that is connected to the scanning electrode 5B is shown.

It is advantageous that a material of the resin substrates 1A and 1b may be one of epoxy, acryl, polyimide, polycarbonate, polyvinyl alcohol, and polyethylene or a composite or laminated resin thereof. In this event, the composite resin as used herein refers to a simple mixture of resins and copolymerized resins.

It is advantageous that the inorganic film 2 may be a film of one of $SiO_x$, $SiN_x$, $GeO_x$, $AlO_x$, $TiO_x$, and $ZrO_x$, or a composite film thereof of a laminated film thereof. When photoelectric properties are taken into account for the cases where the inorganic film 2 is used as the liquid crystal display element as in this embodiment, a film of $SiO_x$ or $SiN_x$ as well as a composite film thereof would be advantageous. In addition, the inorganic film 2 serves as a moisture barrier film that is described below. Accordingly, it is preferable that the inorganic film 2 have a film thickness between 15 nm and 40 nm both inclusive. A film thickness of 15 nm or more makes it possible to keep the water absorption of 0.5% or less by weight for a long period of time. A thicker film would be preferable because of its better moisture barrier properties. However, a film thickness of 40 nm or more may cause cracks in the inorganic film 2 when the inorganic film 2 is subjected to heating. As a result, it is impossible to keep the water absorption of 0.5% or less by weight. With the above respect, it is more preferable that the film thickness be between 30 nm and 40 nm both inclusive.

Figure 2:
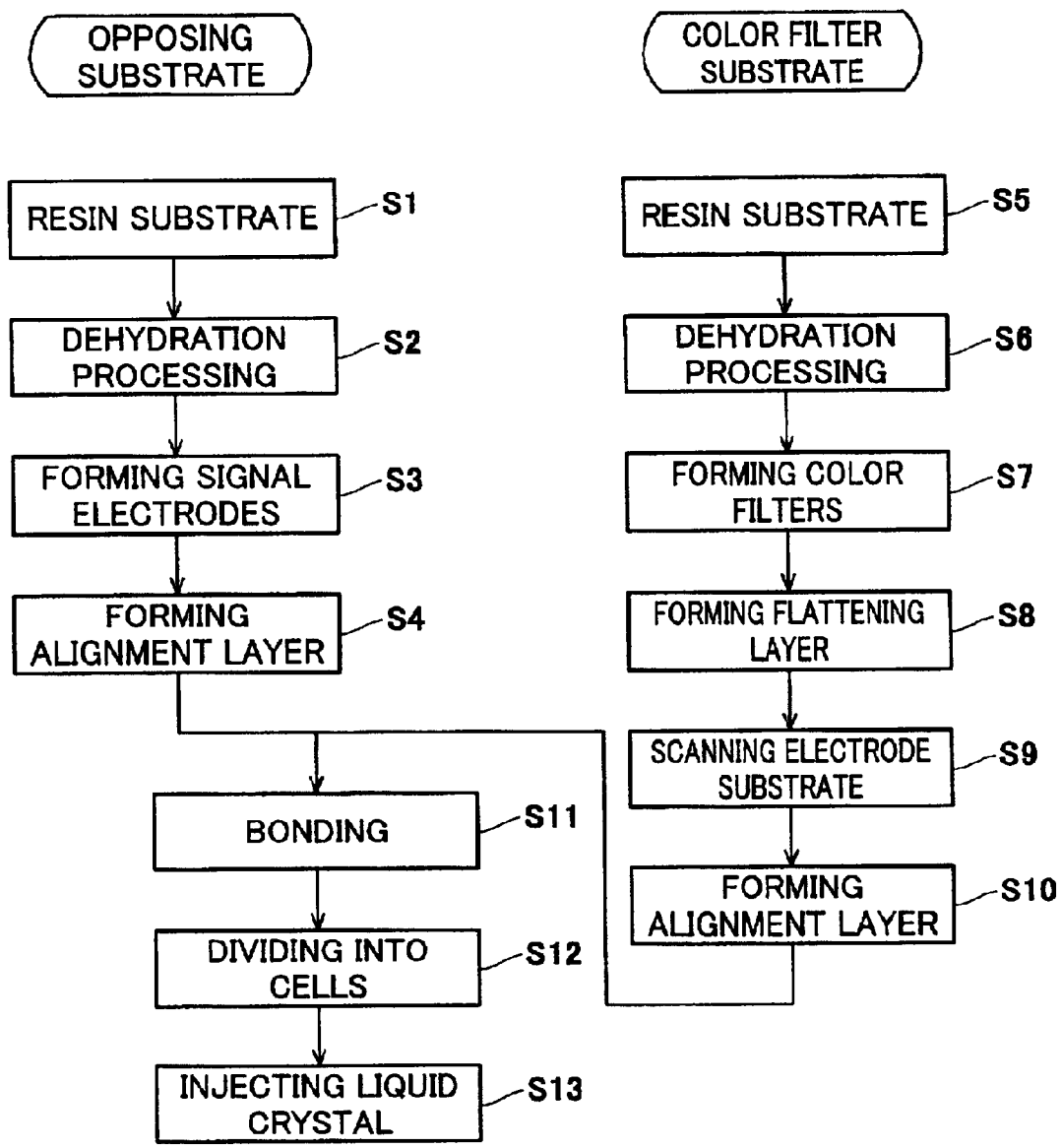
FIG. 2 is a flow chart illustrating an outline of the method for manufacturing a liquid crystal display element in FIG. 1.
Figure 3A:
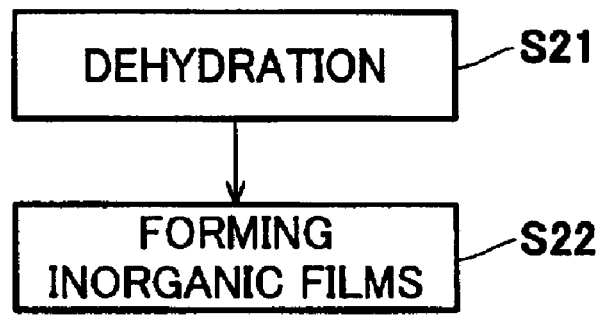
Figure 3B:
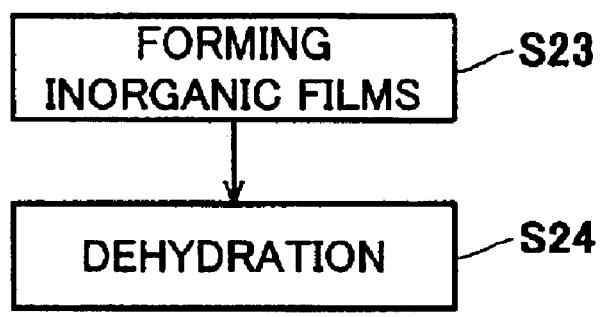

FIG. 2 is a flow chart illustrating an outline of a method for manufacturing an image display element according to this embodiment, and more particularly, an outline of the method for manufacturing the liquid crystal display element in FIG. 1. FIGS. 3a and 3b are views illustrating a configuration of a dehydration processing step in FIG. 2.

Referring to FIGS. 1 to 3, in the method for manufacturing an image display element of the present embodiment, a resin substrate 1A is produced for the opposing substrate 101

(step S1). The resin substrate 1A is introduced into this step as a large sheet that is to be divided into a plurality of resin substrates 1A. It is preferable that the resin substrate 1A have water absorption 2% or less by weight before being introduced into the step because dehydration described below would become easier.

Next, the resin substrate 1A is subjected to a dehydration processing, which is a characteristic feature of the present invention (step S2). The dehydration processing step is, as shown in FIG. 3, formed of a dehydration step and an inorganic film forming step, which one of the steps may precede. In FIG. 3a, the resin substrate 1A is subjected to dehydration in order to achieve the water absorption of 0.5% or less by weight (step S21), just after which the inorganic films 2 are formed on both surfaces of the resin substrate 1A (step S22). On the other hand, in FIG. 3b, the inorganic films 2 are formed on both surfaces of the resin substrate 1A (step S23), following which (either just after it or after expiration of a long period of time) the resin substrate 1A is subjected to dehydration in order to achieve the water absorption of 0.5% or less by weight (step S24).

When the inorganic film 2 is $SiO_x$ or the like, the inorganic film 2 is preferably formed at a temperature between 80° C. and 200° C., preferably 120° C. At this range of the temperature, adhesion between the inorganic film 2 and the resin substrate 1A is improved. In addition, better effects can be obtained when the resin substrate 1A is exposed to an UV (ultraviolet) light beam to make the surfaces of the resin substrate 1A hydrophilic, before or during formation of the inorganic films 2. This processing also improves the adhesion between the inorganic film 2 and the resin substrate 1A. Furthermore, the resin substrate 1A may be coated with $SiCl_4$ before formation of the inorganic films 2. Preferably, a film of $SiCl_4$ is formed as a monomolecular film. This processing also improves the adhesion between the inorganic film 2 and the resin substrate 1A.

Next, dehydration is described. The term "dehydrate" as used herein means removal of water from a subject of dehydration. Heating is a preferable way of dehydration. In this event, a higher heating temperature results in faster achievement of the water absorption of 0.5% or less by weight into the resin substrate 1A. However, the heating temperature that is higher than 200° C. causes deformation of the resin. This changes water absorption and releasing properties of the resin. Accordingly, it is preferable that the heating temperature be between 120° C. and 200° C. both inclusive. Furthermore, when uniformity in dimension within a substrate plane (a plane in which the substrate extends) of the resin substrate 1A is taken into consideration, it is preferable that heating is made uniformly within the substrate plane. Procedures suitable to this include a technique of leaving the substrate in a hot air circulation furnace, and a technique of irradiating a far infrared light beam. In particular, the latter provides excellent uniformity. On the contrary, heating with a hot plate is not preferable because the resin substrate 1A would be warped. As another preferable dehydration procedure, there is a technique of leaving the substrate under a reduced pressure. This technique ensures higher uniformity in dimension within the substrate plane as compared with the dehydration with heat, so that it is a better technique. The dehydration by the pressure reduction is described more in detail in the section of the Embodiment 2.

Next, as shown in FIG. 2, the signal electrodes 5A are formed on the resin substrate 1A on which the inorganic film 2 is formed (step S3). More specifically, the resin substrate 1A is heated to form the signal electrodes 5A in a drying process after washing an etching liquid.

Subsequently, the alignment layer 6A is formed on a predetermined region on the surface of the resin substrate 1A on which the signal electrodes 5A are formed. Upon the formation of the alignment layer 6A the resin substrate 1A is heated to fire the material of the printed alignment layer. Besides, various films not shown in FIG. 2 are formed on the resin substrate 1A in actual practices and the resin substrate 1A is subjected to heating for those purposes. Thus, the opposing substrate 101 is completed in the manner described above.

On the other hand, the resin substrate 1B is produced for the color filter substrate 102 (step S5). Conformation of the resin substrate 1B, requirements therefor, and the dehydration processing for it (step S6) are similar to those in the case of the resin substrate 1A. Accordingly, description thereof is omitted.

Then, the color filters 3 are formed on the inorganic film 2 on the dehydrated resin substrate 1B (step S7).

Then, the flattening layer 4 is formed on the inorganic film 2 on the resin substrate 1B in such a manner that the flattening layer 4 covers the color filters 3 (step S8).

Furthermore, the scanning electrodes 5B and the alignment layer 6B are formed on the flattening layer 4 (steps S9 and S10). How to form the scanning electrodes 5B and the alignment layer 6B is similar to that in the case of the resin substrate 1A. Accordingly, description thereof is omitted. The resin substrate 1B is also subjected to heating to form various films, as in the case of the resin substrate 1A. Thus, the color filter substrate 102 is completed in the manner described above.

Then, the opposing substrate 101 and the color filter substrate 102 are bonded together through the spacers (step S1). In this event, a periphery of the opposing substrate 101 is bonded to a periphery of the color filter substrate 102 with the sealing material 7. The opposing substrate 101 and the color filter substrate 102 are heated to cure the sealing material 7.

Then, the bonded combination of the opposing substrate 101 and the color filter substrate 102 is divided into cells (step S12). Thereafter, the gap between the opposing substrate 101 and the color filter substrate 102 is filled with the liquid crystal and is sealed (step S13). Subsequently, the flexible terminals 9 are connected to the signal electrodes 5A and the scanning electrodes 5B. Then, polarizers are bonded outside the opposing substrate 101 and the color filter substrate 102. Thus, the liquid crystal display element 100 in FIG. 1 is completed in the manner described above.

In the above-mentioned method for manufacturing the liquid crystal display element 100, the resin substrates 1A and 1B having the inorganic films 2 on both surfaces thereof are subjected to dehydration to achieve the water absorption of 0.5% or less by weight. In addition, the inorganic films 2 formed on both surfaces serve as a moisture barrier. The water absorption after the dehydration processing is maintained for a relatively long period of time. Accordingly, the resin substrate shrinks too much smaller degree when the resin substrate is heated and the water is removed therefrom after the dehydration processing, as compared with conventional resin substrates. The dimensional change before and after the heating is significantly small. Consequently, the dimensional change of the color filters 3 and of the electrodes 5A and 5b is significantly small even if the substrate is subjected to heating again and again in all steps after the dehydration. This makes it possible to manufacture the liquid crystal cell without causing any misalignment of the patterns in the subsequent bonding step.

In order to confirm effects that can be obtained through the above, the signal electrodes 101, the scanning electrodes 102, and the liquid crystal cells (the liquid crystal display element before the polarizers are bonded) were formed as Examples to evaluate the dimensional change thereof. The Examples are given below. Dimensions in the following Examples are obtained under a condition at a substrate temperature or an ambient temperature of 22° C., and humidity of 50% RH, if not specifically noted.

EXAMPLE 1

In Example 1, the inorganic film forming step was carried out after the dehydration step in the dehydration processing step. More specifically, an epoxy resin sheet (sheet thickness of 0.4 mm; hereinafter, referred to as a resin substrate) having the water absorption of 1.0% by weight was prepared as a large sheet that is eventually to be divided into a plurality of resin substrates. The epoxy resin sheet was heated at 120° C. for 7 hours to achieve the water absorption of approximately 0.1% by weight. Immediately thereafter, $SiO_2$ layers were formed to have a thickness of 20 nm by sputtering as the inorganic films on both surfaces of the resin substrate. A transparent electrode film of ITO was formed on one of the surfaces to have a thickness of 150 nm. A negative photoresist was applied to the resin substrate. The resin substrate was dried at 120° C. for 5 minutes. Next, the negative photoresist on the resin substrate was exposed to light beams at an ambient temperature through a striped mask having an unmask/mask space ratio of 90/10, 83.3 μm pitch. The resin substrate was subjected at a room temperature to development of the photoresist, etching of the transparent electrode films, and removal of the photoresist. The resin substrate was dried at 120° C. for 15 minutes to form signal electrodes. Thus, the substrate (opposing substrate) A7 was produced, and an initial value of the dimension of 1,200 lines of the signal electrodes was measured. Subsequently, a dry processing at 120° C. for 15 minutes (i.e., a heating cycle involving heating to 120° C. and cooling to a room temperature) was repeated at the predetermined number of times. The dimension of the signal electrodes on the substrate was measured after each dry processing. The dry processing is similar to the heat processing in the steps for manufacturing the liquid crystal display element in FIG. 2.

The procedures used to obtain the substrate A7 were repeated to produce substrates A5, A2.5, and A1.5 except that epoxy resin sheets (sheet thickness of 0.4 mm) each having the water absorption of 1.0% by weight were heated at 120° C. for 5 hours, at 120° C. for 2.5 hours, and at 120° C. for 1.5 hours, respectively to achieve the water absorption of approximately 0.2%, 0.4%, and 0.5% by weight, respectively. The dimensional change of 1,200 lines of the signal electrodes due to drying was measured, as in the case of the substrate A7.

COMPARATIVE EXAMPLE 1

Substrates B1 and B0 were produced as a comparative example to the Example 1. The dimensional change of 1,200 lines of the signal electrodes due to drying was measured, as in the Example 1. The Example 1 was repeated to produce the substrates B1 and B0 except that epoxy resin sheets (sheet thickness of 0.4 mm) each having the water absorption of 1.0% by weight were heated at 120° C. for 1 hour and at 120° C. for 0 hours (no heating), respectively to achieve the water absorption of 0.6% and 1.0% by weight, respectively.

[Dimensional (Pattern Dimensional) Change of Signal Electrodes]

Figure 4:
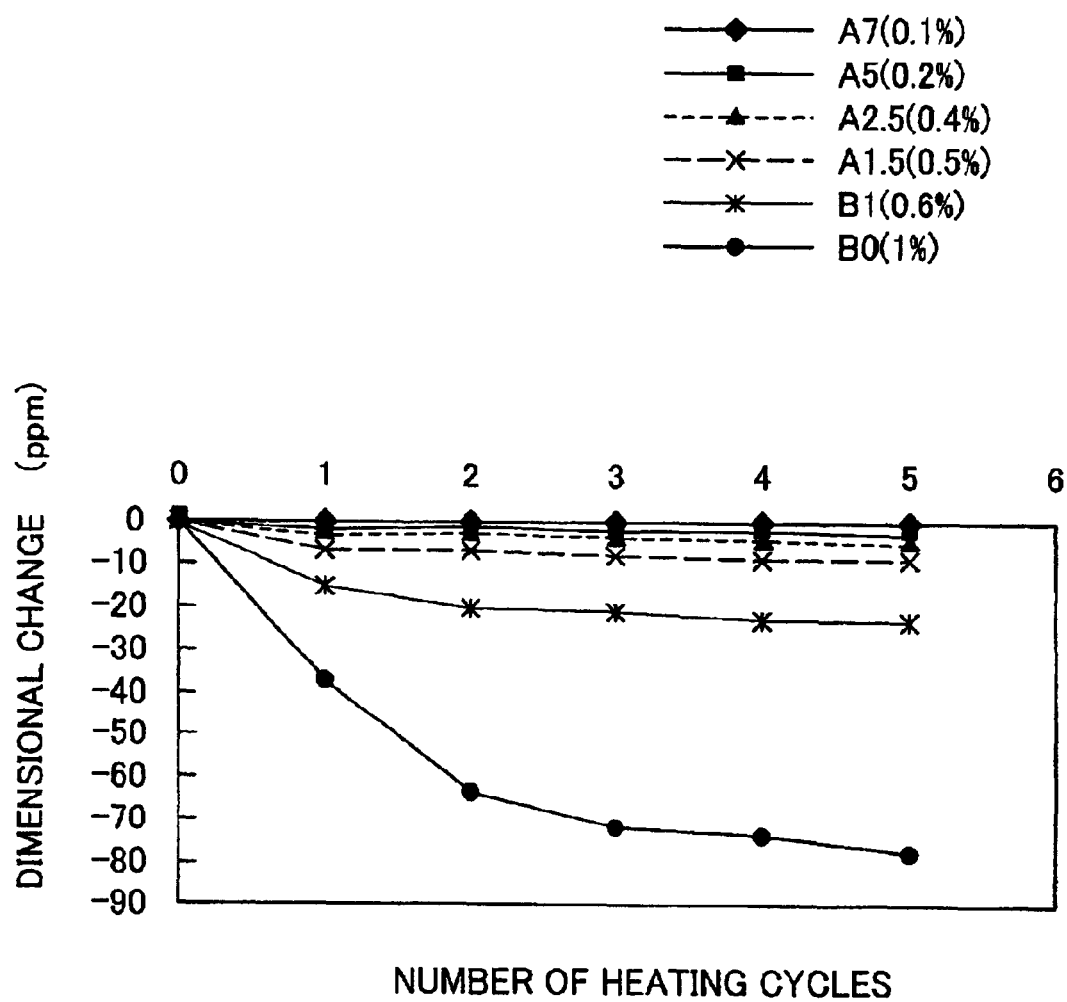
FIG. 4 is a graphical representation of dimensional changes of signal electrodes in groups of substrate A and substrate B, as a function of the number of heating cycles, with water absorption into the substrates used as a parameter.

FIG. 4 is a graphical representation of dimensional changes of the signal electrodes in groups of substrate A and substrate B, as a function of the number of heating cycles, with water absorption into the substrates used as a parameter. In FIG. 4, the number 0 of the heating cycle corresponds to a mask dimension. The substrates in the group of substrate B having water absorption of at least 0.5% shrink to a larger degree than the mask pattern. They shrink in every heating cycle. This indicates that the group of substrate B is difficult to be used in steps for manufacturing, for example, liquid crystal display elements. On the contrary, the substrates having the water absorption of 0.5% by weight shrink about 10 ppm. This is within a range applicable as the substrates for a liquid crystal display element.

A reason for this phenomenon may lie in the fact that the substrate having larger water absorption is dehydrated to a larger degree during the heating step and the substrate shrinks to a larger degree accordingly. In particular, water absorption of more than 0.5% by weight is in a physical moisture absorption state or an excess water absorption state. Therefore, a slight change in temperature (low heating temperature) tends to cause absorption and removal of water, significantly changing the dimension. On the other hand, water absorption of not more than 0.5% by weight is in a chemical moisture absorption state. Therefore, absorption and removal of water hardly occur at a relatively high temperature. The dimensional change is less accordingly.

EXAMPLE 2

In Example 2, the dehydration step was carried out after the inorganic film forming step in the dehydration processing step. More specifically, an epoxy resin sheet (sheet thickness of 0.4 mm) having the water absorption of 1.0% by weight was prepared as the resin substrate. $SiO_2$ layers were formed to have a thickness of 20 nm by sputtering as the inorganic films on both surfaces of the resin substrate. Thereafter, the resin substrate was heated at 120° C. for 72 hours to achieve the water absorption of 0.1% by weight. A transparent electrode film of ITO was formed to have a thickness of 150 nm by sputtering on one surface of the resin substrate. A negative photoresist was applied to the resin substrate, which was dried at 120° C. for 5 minutes. The negative photoresist on the resin substrate was exposed to light beams at an ambient temperature through a striped mask having an unmask/mask space ratio of 90/10, 83.3 μm pitch. The resin substrate was subjected at a room temperature to development of the photoresist, etching of the transparent electrode films, and removal of the photoresist, to form the signal electrodes. A substrate C72 was produced in the manner described above. For the substrate C72, the dimensional change of 1,200 lines of the signal electrodes due to drying was measured, as in the Example 1. Conditions for the drying are similar those in the Example 1.

In addition, substrates C48, C24, and C12 were produced and the dimensional change of 1,200 lines of the signal electrodes due to drying was measured as in the substrate C72. The procedures used to obtain the substrate C72 were repeated to produce the substrates C48, C24, and C12 except that $SiO_2$ layers were formed to have a thickness of 20 nm by sputtering as the inorganic films on both surfaces of epoxy resin sheets (sheet thickness of 0.4 mm) each having the water absorption of 1.0% by weight into the resin substrate and that the epoxy resin sheets were heated at 120° C. for 48 hours, at 120° C. for 24 hours, and 120° C. for 12 hours, respectively to achieve the water absorption of approximately 0.2%, 0.4%, and 0.5% by weight, respectively.

COMPARATIVE EXAMPLE 2

Substrates D10 and D0 were produced as a comparative example to the Example 2. The dimensional change of 1,200 lines of the signal electrodes due to drying was measured, as in the Example 2. The Example 2 was repeated to produce the substrates D10 and D0 except that $SiO_2$ layers were formed to have a thickness of 20 nm by sputtering as the inorganic films on both surfaces of epoxy resin sheets (sheet thickness of 0.4 mm) each having the water absorption of 1.0% by weight and that the epoxy resin sheets were heated at 120° C. for 10 hours and at 120° C. for 0 hours (no heating), respectively to achieve the water absorption of approximately 0.6% and 1.0% by weight, respectively.

[Dimensional (Pattern Dimensional) Change of Signal Electrode]

Figure 5:
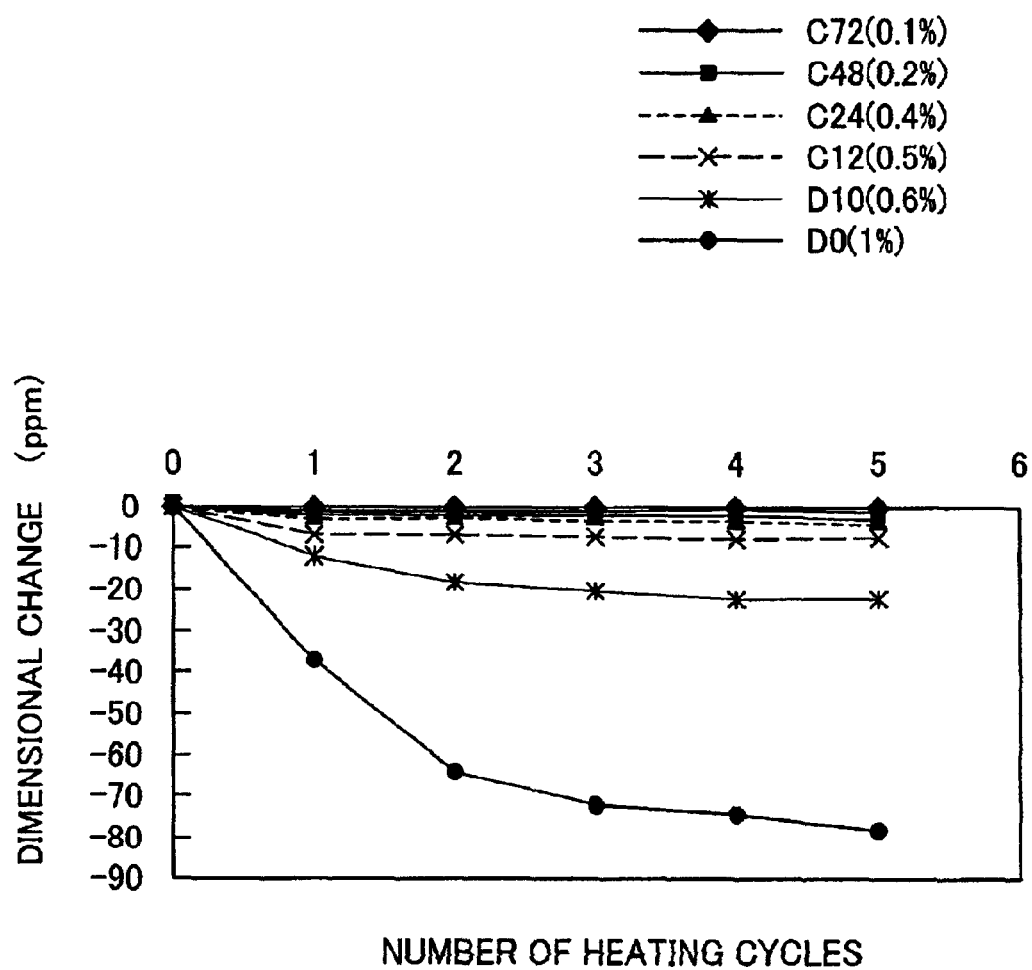
FIG. 5 is a graphical representation of dimensional changes of signal electrodes in groups of substrate C and substrate D, as a function of the number of heating cycles, with water absorption into the substrates used as a parameter.

FIG. 5 is a graphical representation of dimensional changes of the signal electrodes in groups of substrate C and substrate D, as a function of the number of heating cycles, with water absorption into the substrates used as a parameter. In FIG. 5, the number 0 of the heating cycle corresponds to a mask dimension. From the dimensional change given in FIG. 5, it was confirmed that similar phenomena to those in the Example 1 and in the Comparative Example 1 were observed in this manufacturing method.

Comparison between the Example 1 and the Example 2 suggests that the Example 1 has an advantage of the time-saving dehydration step while there is a high possibility that the substrate absorbs water in the subsequent steps. On the contrary, Example 2 has a disadvantage of a time-consuming dehydration step because of the inorganic films formed on the resin substrate while there is a low possibility that the substrate absorbs water in the subsequent steps. Therefore, the optimum choice should be determined for each case, considering other steps than dehydration.

EXAMPLE 3

In Example 3, a thickness of the inorganic films formed on the resin substrate was changed. More specifically, the procedures used to obtain the substrate A7 of the Example 1 were repeated to produce substrates A7-15, A7-25, and A7-40 except that the $SiO_2$ layers as the inorganic films of 15 nm thick, 25 nm thick, and 40 nm thick, respectively were formed. The dimensional change of 1,200 lines of the signal electrodes due to drying was measured, as in the Example 1. The water absorption into the substrates was also measured in addition to the dimensional change.

COMPARATIVE EXAMPLE 3

As a comparative example to the Example 3, The Example 3 was repeated to produce substrates B7-0, B7-10, and B7-45 except that the $SiO_2$ layers as the inorganic films of 0 nm thick, 10 nm thick, and 45 nm thick, respectively were formed. The dimensional change of 1,200 lines of the signal electrodes was measured, as in the Example 3. The water absorption into the substrates was also measured in addition to the dimensional change.

[Relation Between Film Thickness of Inorganic Film and Dimensional Change]

Figure 6:
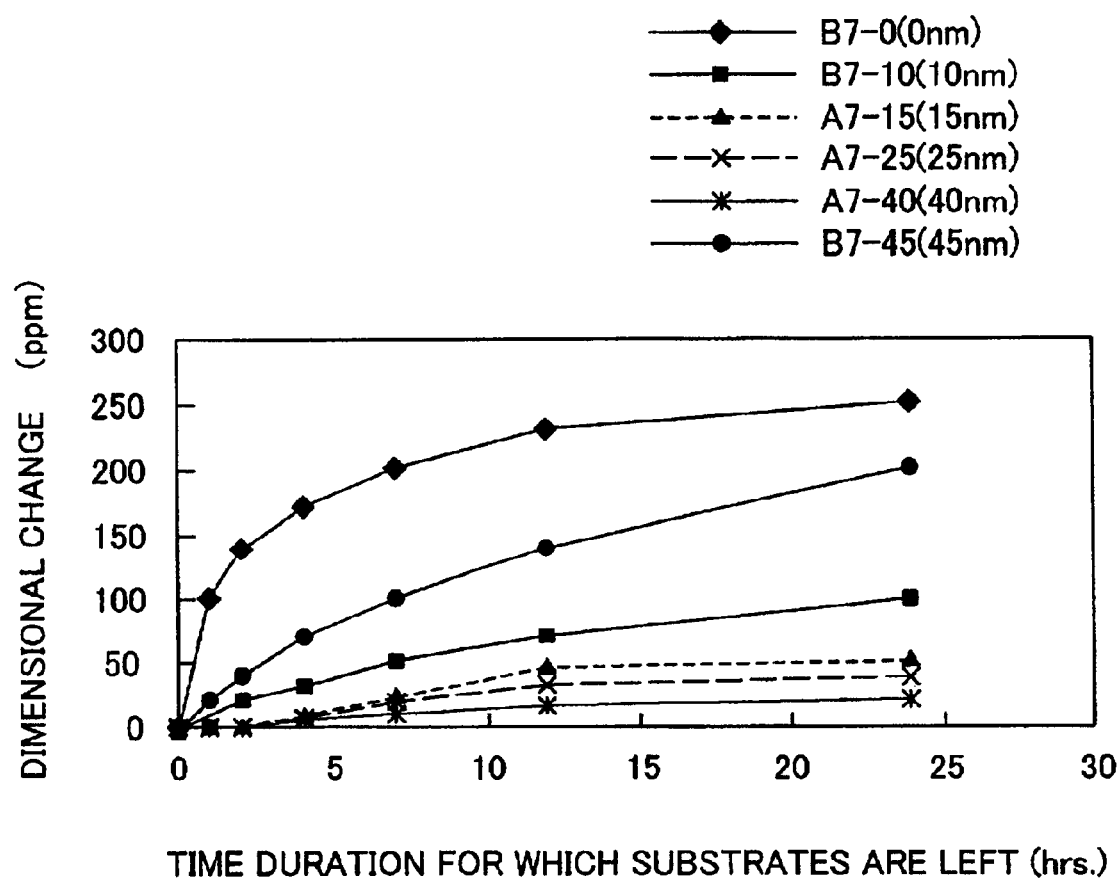
FIG. 6 is a graphical representation of dimensional changes of signal electrodes in groups of substrate A7 and substrate B7, as a function of a time duration for which the substrates are left, with a film thickness of an inorganic film used as a parameter.

FIG. 6 is a graphical representation of dimensional changes of the signal electrodes in groups of substrate A7 and substrate B7, as a function of a time duration for which the substrates are left, with a film thickness of an inorganic film used as a parameter. As shown in FIG. 6, the substrates having inorganic films of less than 10 nm in film thickness were observed to enlarge their dimension in some 1 hour. They are difficult to be used for steps that are associated with dimensions of liquid crystal display elements. On the other hand, the substrates having inorganic films of not less than 10 nm in film thickness do not exhibit significant dimensional change over 4 hours. This value does not exceed an allowable range of 10 ppm for the dimensional change of the substrate for the liquid crystal display element. On the other hand, the substrates having inorganic films of more than 40 nm in film thickness were observed to enlarge their dimension in some 2 hours due to the moisture absorption. Since cracks were found in the inorganic films ($SiO_2$ films), it can be expected that the $SiO_2$ films do not serve as the moisture barrier films. These substrates are also difficult to be used for steps that are associated with dimensions of liquid crystal display elements.

EXAMPLE 4

In Example 4, types of the inorganic films were changed. The procedures used to obtain the substrate A7 of the Example 1 were repeated to produce a substrate AS7 except that $SiN_x$ layers were formed to have a thickness of 20 nm as the inorganic films in place of the $SiO_2$ layers. The dimensional change of 1,200 lines of the signal electrodes was measured, as in the Example 1.

[Relation Between Type of Inorganic Films and Dimensional Change of Signal Electrodes]

Figure 7:
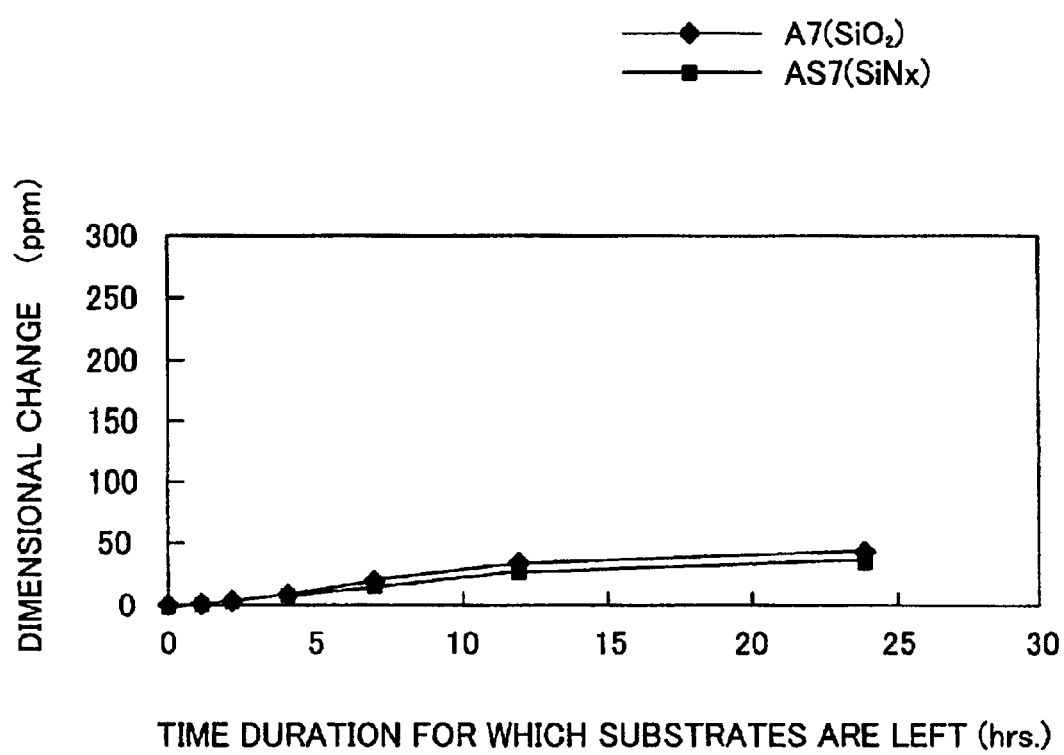
FIG. 7 is a graphical representation of dimensional changes of signal electrodes in groups of the substrate A7 and substrate AS7, as a function of a time duration for which the substrates are left, with a type of an inorganic film used as a parameter.

FIG. 7 is a graphical representation of dimensional changes of the signal electrodes on the substrates A7 and AS7, as a function of a time duration for which the substrates are left, with a type of an inorganic film used as a parameter. As apparent from FIG. 7, the $SiN_x$ films exhibit similar dimensional behavior to that of the $SiO_2$ films and serve as the moisture barrier films. Consequently, the substrate AS7 having the $SiN_x$ films formed thereon can maintain the water absorption or 0.5% or less by weight for a long period of time. Besides, inorganic films of $AlO_x$, $TiO_x$, and $ZrO_x$ also exhibit similar behaviors to that of the $SiN_x$ film. However, these films have a larger dielectric constant than the $SiO_2$ film, so that they are not suitable for the substrates of a liquid crystal display element.

EXAMPLE 5

In Example 5, a semi-completed color filter substrate was produced.

The inorganic film forming step was carried out after the dehydration step in the dehydration processing step. More specifically, an epoxy resin sheet (sheet thickness of 0.4 mm) having the water absorption of 1.0% by weight was prepared as a resin substrate. The epoxy resin sheet was heated at 120° C. for 7 hours to achieve the water absorption of approximately 0.1% by weight. Immediately thereafter, $SiO_2$ layers were formed to have a thickness of 20 nm by sputtering as the inorganic films on both surfaces of the resin substrate. Then, 400 pairs of color filters each consisting of sub-filters of R, G, and B were printed at 250 $\mu$m pitch (the sub-filters of R, G, and B were each 83.3 $\mu$m pitch) on one surface of the resin substrate in an ambient temperature, which was then dried at 120° C. for 15 minutes to obtain a substrate (semi-completed color filter substrate) E. Initial dimensions of the 400 pairs of color filters were measured. Subsequently, a dry processing at 120° C. for 15 minutes (i.e., a heating cycle involving heating to 120° C. and cooling to a room temperature) was repeated at the predetermined number of times. The dimensions of the color filters on the substrate E were measured after each dry processing.

EXAMPLE 6

In Example 6, a semi-completed color filter substrate was produced. The dehydration step was carried out after the inorganic film forming step in the dehydration processing step. More specifically, an epoxy resin sheet (sheet thickness of 0.4 mm) having the water absorption of 1.0% by weight was prepared as a resin substrate. $SiO_2$ layers were formed to have a thickness of 20 nm by sputtering as the inorganic films on both surfaces of the resin substrate. The resulting resin substrate was heated at 120° C. for 72 hours to achieve the water absorption of approximately 0.1% by weight. Subsequently, 400 pairs of color filters each consisting of sub-filters of R, G, and B were printed at 250 μm pitch (the sub-filters of R, G, and B were each 83.3 μm pitch) on one surface of the resin substrate in an ambient temperature, which was then dried at 120° C. for 15 minutes to obtain a substrate (semi-completed color filter substrate) F. The dimensional change of the 400 pairs of color filters due to drying was measured, as in the Example 5.

COMPARATIVE EXAMPLE 4

As comparative examples to the Examples 5 and 6, a substrate G was produced and the dimensional change of the 400 pairs of color filters due to drying was measured, as in the Example 5. The substrate G was made as follows. An epoxy resin sheet (sheet thickness of 0.4 mm) having the water absorption of 1.0% by weight was prepared as a resin substrate. $SiO_2$ layers were formed to have a thickness of 20 nm by sputtering as the inorganic films on both surfaces of the resin substrate. Subsequently, 400 pairs of color filters each consisting of sub-filters of R, G, and B were printed at 250 μm pitch (the sub-filters of R, G, and B were each 83.3 μm pitch) on one surface of the resin substrate in an ambient temperature, which was then dried under a condition at 120° C. for 15 minutes.

[Dimensional Change of Color Filters]

Figure 8:
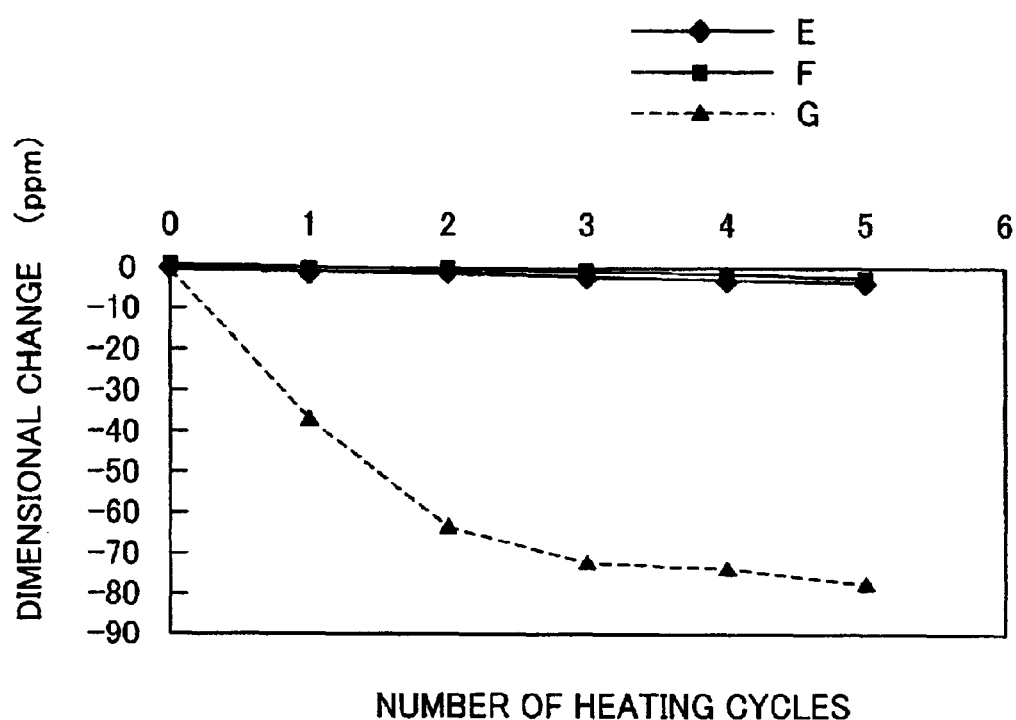
FIG. 8 is a graphical representation of dimensional changes of color filters on substrates E, F, and G, as a function of the number of heating cycles.

FIG. 8 is a graphical representation of dimensional changes of the color filters on the substrates E, F, and G, as a function of the number of heating cycles. In FIG. 8, the number 0 of the heating cycle corresponds to a mask dimension. It is apparent from FIG. 8 that the substrate G having the water absorption of more than 0.5% by weight exhibits shrinkage to a larger degree than the mask pattern does and that the substrate G shrinks for every heating cycle. This indicates that the substrate G is difficult to be used in manufacture steps involving repeated heating of liquid crystal display elements. On the other hand, the degree of shrinkage of the substrates E and F is less than 10 ppm, which is within a range applicable as the substrate for the liquid crystal display element.

EXAMPLE 7

In Example 7, a liquid crystal display element was produced. More specifically, a flattening film layer was formed on the substrate E of the Example 5, on which a transparent electrode film of ITO was formed to have a thickness of 150 nm. Subsequently, a negative photoresist was applied to the transparent electrode film and was dried under a condition at 120° C. for 5 minutes. The negative photoresist was exposed to light beams at an ambient temperature, with a striped mask (that has an unmask/mask space ratio of 80/20, a design value of 250 μm pitch) being set at right angles to the striped color filters. The resin substrate was subjected at a room temperature to development of the photoresist, etching of the transparent electrode films, and removal of the photoresist. The resin substrate was dried at 120° C. for 15 minutes to form scanning electrodes. Thus, a color filter substrate H was produced. The dimension of 1,200 lines of the color filters was 100.0002 mm. The dimension of 400 lines of the scanning electrodes was 100.0005 mm.

The substrate A7 of the Example 1 was used as the opposing substrate. The dimension of 1,200 lines of the signal electrodes was 100.0007 mm.

Subsequently, spacers were applied to the opposing substrate A7. A sealing material was printed on the color filter substrate H. These substrates were heated under a condition at 120° C. for 5 minutes. Next, the substrates were returned to an ambient temperature. The opposing substrate A7 and the color filter substrate H were bonded together so that the patterns of the signal electrodes on the opposing substrate are matched to the patterns of the color filters on the color filter substrate. The combination of the bonded substrates was heated under a condition at 120° C. for 3 hours to cure the sealing material. In this way, a liquid crystal display element I was manufactured according to the manufacture method of the present embodiment (more exactly, steps of injecting the liquid crystal, dividing the substrates into liquid crystal cells, and bonding the polarizers are omitted).

COMPARATIVE EXAMPLE 5

As a comparative example to the Example 7, a liquid crystal display element K was manufactured. More specifically, a flattening film layer was formed on the substrate G of the Comparative Example 4, on which a transparent electrode film of ITO was formed to have a thickness of 150 nm. Subsequently, a negative photoresist was applied to the transparent electrode film and was dried under a condition at 120° C. for 5 minutes. The negative photoresist was exposed to light beams at an ambient temperature, with a striped mask (that has an unmask/mask space ratio of 80/20, a design value of 250 μm pitch) being set at right angles to the striped color filters. The resin substrate was subjected at a room temperature to development of the photoresist, etching of the transparent electrode films, and removal of the photoresist. The resin substrate was dried at 120° C. for 15 minutes to form scanning electrodes. Thus, a color filter substrate J was produced. The dimension of 1,200 lines of the color filters was 99.9922 mm. The dimension of 400 lines of the scanning electrodes was 99.9961 mm.

The substrate B0 of the Comparative Example 1 was used as the opposing substrate. The dimension of 1,200 lines of the signal electrodes was 99.9964 mm.

Subsequently, spacers were applied to the opposing substrate B0. A sealing material was printed on the color filter substrate J. These substrates were heated under a condition at 120° C. for 5 minutes. Next, the substrates were returned to an ambient temperature. The opposing substrate B0 and the color filter substrate J were bonded together so that the patterns of the signal electrodes on the opposing substrate are matched to the patterns of the color filters on the color filter substrate. The combination of the bonded substrates was heated under a condition at 120° C. for 3 hours to cure the sealing material. In this way, the liquid crystal display element K of the Comparative Example was manufactured.

[Bonding Pattern Accuracy]

The dimension of 1,200 lines of the signal electrodes on the opposing substrate was compared with the dimension of 1,200 lines of the color filters on the color filter substrate. The minimum aperture ratio among all pixels was determined based on the misalignment of the patterns. The results are given in FIG. 9. As apparent from FIG. 9, the misalignment of the patterns and the aperture ratio indicate that the manufacture method of the present invention is superior in bonding pattern accuracy to the Comparative Example 5.

EXAMPLE 8

In Example 8, flexible terminals each having a line/space ratio of 90/10 were adhered at 1,200 lines/100 mm to 1,200 lines of the signal electrodes on the opposing substrate A7 and 1,200 lines of the scanning electrodes on the color filter substrate H of the liquid crystal display element I of the Example 7.

COMPARATIVE EXAMPLE 6

As a comparative example to the Example 8, flexible terminals each having a line/space ratio of 90/10 were adhered at 1,200 lines/100 mm to 1,200 lines of the signal electrodes on the opposing substrate B0 and 1,200 lines of the scanning electrodes on the color filter substrate J of the liquid crystal display element K of the Comparative Example 5.

[Pattern Accuracy of Flexible Terminals]

The dimension of 1,200 lines of the flexible terminals was compared with the dimensions of 1,200 lines of the signal electrodes and 1,200 lines of the scanning electrodes on the liquid crystal display element to determine the misalignment of patterns. In addition, the contact ratio between the signal electrodes/the scanning electrodes and the flexible terminals was compared. The results are given in FIGS. 10 and 11. As apparent from FIGS. 10 and 11, the misalignment of the patterns and the contact ratio indicate that the manufacture method of the present invention is superior in bonding pattern accuracy to the Comparative Example 6. It is noted that the adjacent lines do not contact with each other because of the space dimension of 8 μm. However, the adjacent lines may contact with each other in the Comparative Example when the space dimension is reduced to achieve high-definitions.

Embodiment 2

A method for manufacturing a liquid crystal display element according to the Embodiment 2 of the present invention is characterized in that the dehydration processing step in the method for manufacturing the liquid crystal display element according to the Embodiment 1 comprises a reduced pressure dehydration step of leaving the resin substrate under a reduced pressure, and an inorganic film forming step of forming inorganic films on both surfaces of the resin substrate subjected to dehydration under a reduced pressure. Other components and features are similar to those in the Embodiment 1.

Any gases are blocked by the inorganic films in the resin substrate dehydrated in the manner described above. The gases do not tend to be absorbed. Therefore, the dimensional change before and after the heating is significantly small. When formation of the color filters, patterning of the signal electrodes and the scanning electrodes are carried out by using the resin substrate described herein, the dimensional change of the color filters and of the electrodes is significantly small even if the resin substrate is subjected to heating again and again in subsequent steps for manufacturing the liquid crystal display element. This means that the liquid crystal cells can be manufactured without causing any misalignment of the patterns in bonding the substrates.

In the above-mentioned reduced pressure dehydration step, the contents of the impurities in the resin substrate are reduced. Examples of the impurities include non-reacted polymerization initiators, monomers, or water as a reaction product, which remained in the resin substrate.

The term "under a reduced pressure" as used in the present embodiment means a pressure not higher than the atmospheric pressure. It is preferable that the reduced pressure be 0.5 ATM or less from the viewpoint of a rate of water removal. Alternatively, it is preferable that the reduced pressure be $1.33 \times 10^{-2}$ Pa when performed in combination with, for example, sputtering for deposition of the inorganic films before the sputtering.

In the present embodiment, the heating step may be carried out after the inorganic film forming step. This heating step is intended to re-absorb the gases removed from the resin substrate or from the resin substrate having at least inorganic films on both surfaces thereof under the reduced pressure. A higher atmospheric pressure or a higher heating temperature results in faster absorption of the gas into the resin substrate. However, a normal pressure is preferable from the workability standpoint. The heating temperature that is higher than 200° C. causes deformation of the resin. This changes absorption and removal properties of the resin. Accordingly, it is preferable that the heating temperature be between 120° C. and 200° C. both inclusive. Furthermore, when uniformity in dimension within a substrate plane is taken into consideration, it is preferable that heating is made uniformly within the substrate plane. Procedures suitable to this include a technique of leaving the substrate in a hot air circulation furnace, and a technique of irradiating a far infrared light beam. In particular, the latter provides excellent uniformity. On the contrary, heating with a hot plate is not preferable because the resin substrate would be warped. An inert gas as an atmosphere of the heating step is preferable. The inert gas means a gas that does not affect the resin and nitrogen may be effective. Air is preferable from the viewpoint of dimensional stability because it does not cause the resin to be changed due to absorption and removal of the gas in a normal atmosphere though it may possibly lead oxidative degradation of the resin. A humidity may be 35% or less. This makes it possible to manufacture substrates that exhibit very small dimensional change after repeated heating as well as at a room temperature because the resin thereof absorbs less moisture.

In order to confirm effects that can be obtained through the above, the signal electrodes, the scanning electrodes, and the liquid crystal cells were formed as Examples to evaluate the dimensional change thereof, as in the Embodiment 1. The Examples are given below.

EXAMPLE 9

In Example 9, an epoxy resin sheet (sheet thickness of 0.4 mm) was left for 1 hour at a room temperature under a reduced pressure of $1.33 \times 10^{-3}$ Pa. Immediately thereafter, $SiO_2$ layers were formed to have a thickness of 20 nm by sputtering as the inorganic films on both surfaces of the resin substrate. A transparent electrode film of ITO was formed on one of the surfaces to have a thickness of 150 nm. A negative photoresist was applied to the resin substrate. The resin substrate was dried at 120° C. for 5 minutes. Next, the negative photoresist on the resin substrate was exposed to light beams at an ambient temperature through a striped mask having an unmask/mask space ratio of 90/10, 83.3 μm pitch. The resin substrate was subjected at a room temperature to development of the photoresist, etching of the transparent electrode films, and removal of the photoresist to form the signal electrodes. Thus, a substrate (opposing substrate) H was produced. An initial value of the dimension of 1,200 lines of the signal electrodes was measured. Thereafter, 24-hour cycles (hereinafter, referred to as a heating/leaving cycle) were repeated. Each cycle involves in heating at 120° C. for 1 hour under a normal atmosphere and leaving for 23 hours. The dimensional change of the substrate H was then measured.

EXAMPLE 10

In Example 10, an epoxy resin sheet (sheet thickness of 0.4 mm) used as the resin substrate was left for 1 hour at a room temperature under a reduced pressure of $1.33 \times 10^{-3}$ Pa and was then heated at 120° C. for 15 minutes under a normal pressure in anhydrous air. Immediately thereafter, $SiO_2$ layers were formed to have a thickness of 20 nm by sputtering as the inorganic films on both surfaces of the resin substrate. A transparent electrode film of ITO was formed on one of the surfaces to have a thickness of 150 nm. After that, the procedures as in the Example 9 were repeated to produce a substrate I. An initial value of the dimension of 1,200 lines of the signal electrodes was measured. Thereafter, as in the Example 9, the dimensional change of the signal electrodes due to the heating/leaving cycle was measured.

EXAMPLE 11

In Example 11, an epoxy resin sheet (sheet thickness of 0.4 mm) as the resin substrate was left for 1 hour at a room temperature under a reduced pressure of $1.33 \times 10^{-3}$ Pa. $SiO_2$ layers were formed to have a thickness of 20 nm by sputtering as the inorganic films on both surfaces of the resin substrate. A transparent electrode film of ITO was formed on one of the surfaces to have a thickness of 150 nm. It was then heated at 120° C. for 1 hour under a normal pressure in anhydrous air. After that, the procedures as in the Example 9 were repeated to produce a substrate J. An initial value of the dimension of 1,200 lines of the signal electrodes was measured. Thereafter, as in the Example 9, the dimensional change of the signal electrodes due to the heating/leaving cycle was measured.

COMPARATIVE EXAMPLE 7

A substrate K was produced as a comparative example to the Examples 9 to 11. The substrate K was made as follows. $SiO_2$ layers were formed to have a thickness of 20 nm by sputtering as the inorganic films on both surfaces of an epoxy resin sheet (sheet thickness of 0.4 mm) used as the resin substrate. A transparent electrode film of ITO was formed on one of the surfaces to have a thickness of 150 nm. After that, the procedures as in the Example 9 were repeated to produce the substrate. An initial value of the dimension of 1,200 lines of the signal electrodes was measured. Thereafter, as in the Example 9, the dimensional change of the signal electrodes due to the heating/leaving cycle was measured.

[Dimensional Change of Signal Electrodes (Patterns)]

Figure 12:
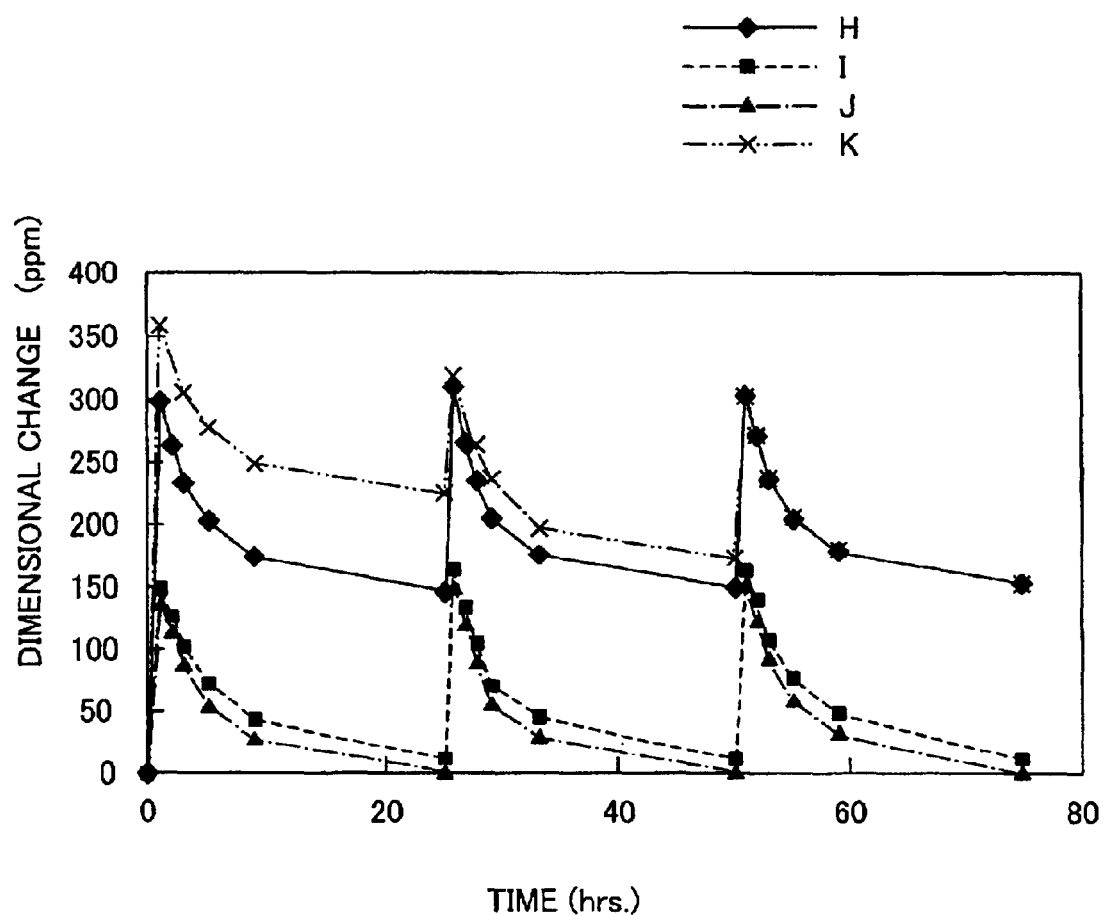
FIG. 12 is a graphical representation of dimensional changes of signal electrodes on substrates H, I, J, and K, as a function of time.

FIG. 12 is a graphical representation of dimensional changes of the signal electrodes on the substrates H, I, J, and K, as a function of time. In FIG. 12, the time "0" corresponds to a mask dimension. It is indicated that all substrates expand due to the heating. In particular, it is indicated that the substrate K of the Comparative Example 7 expands to a large degree due to the heating and a dimensional behavior of that substrate varies (shrinks) for every heating/leaving cycle. On the contrary, it is found that no change in dimensional behavior occurs for every heating/leaving cycle in the substrate H. Furthermore, it is found that the substrates I and J expand to a lower degree by the heating and dimensional behaviors of these substrates for every heating/leaving cycle are not changed.

A reason for this phenomenon may lie in the fact that impurities, especially water components (or, for example, residual monomers), in the resin substrates are removed from the substrates H, I, and J when they are left under a reduced pressure, so that no release of the impurities occurs during the subsequent repeated heating/leaving cycles and no change in dimensional behavior occurs, as compared with the substrate K. It should be noted that the gases in the resin, such as air, are also removed when it is left under a reduced pressure. Therefore, the substrate H absorbs gases during the first heating processing after the removal. This enlarges the dimension. If the substrate is first left under a reduced pressure and is then heated beforehand, as in the substrates I and J, the gases are absorbed into the resin. No change in dimensional behavior occurs during the subsequent repeated heating.

This indicates that the substrate K of the Comparative Example 7 is difficult to be used in manufacture steps involving repeated heating of liquid crystal display elements.

The substrates I and J are superior because the dimensional behavior thereof does not change after the repeated heating. A method of deposition as well as impurities are important issues for the substrate I because the inorganic films of the substrate should be deposited under a normal pressure. On the other hand, the steps of leaving under a reduced pressure and removing the impurities may be combined with the step of sputtering under a reduced pressure the inorganic films and the transparent electrode film in the substrate J. Thus, the method for manufacturing the substrate J can be manufactured through more simplified steps.

EXAMPLE 12

In Example 12, the Example 11 was repeated to produce a substrate L except that $SiN_x$ layers were formed as the inorganic films in place of the $SiO_2$ layers. An initial value of the dimension of 1,200 lines of the signal electrodes was measured. Thereafter, as in the Example 11, the dimensional change of the signal electrodes due to the heating/leaving cycle was measured.

[Relation Between Type of Inorganic Films and Change in Pattern Dimensions]

Figure 13:
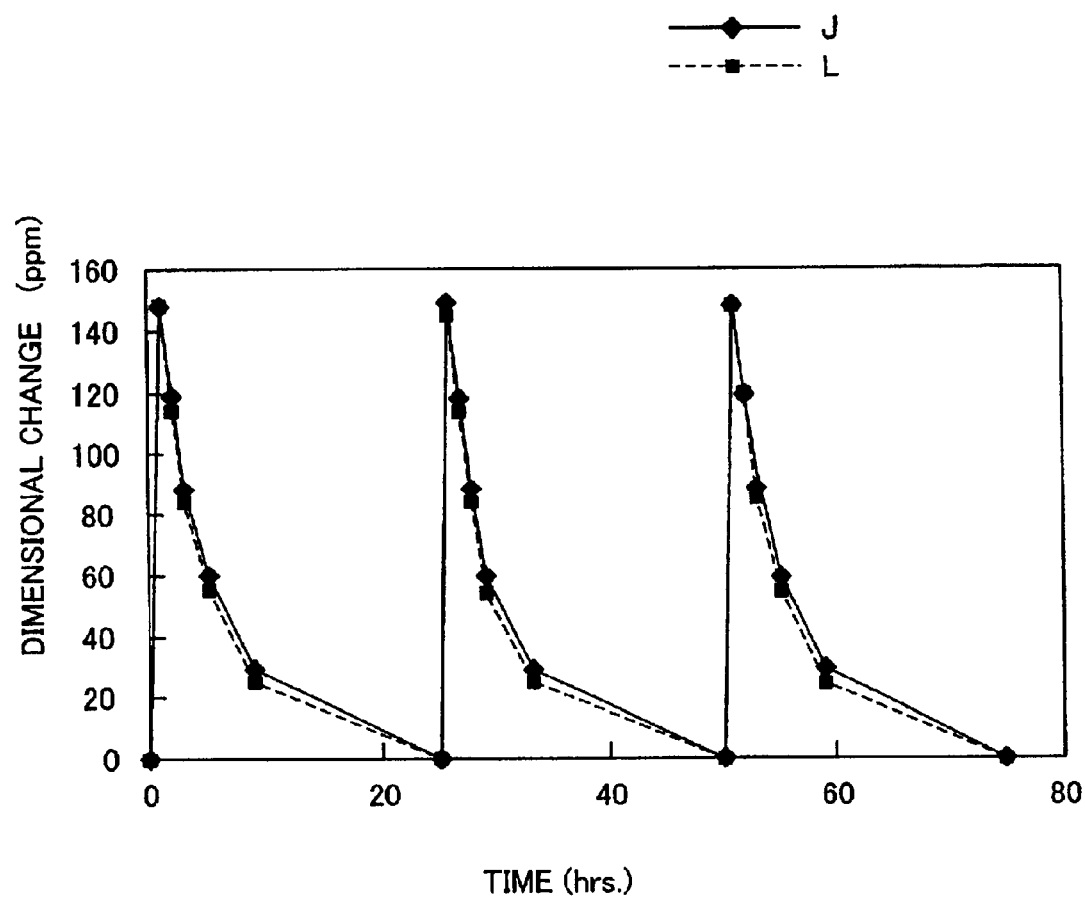
FIG. 13 is a graphical representation of dimensional changes of signal electrodes on substrates J and L, as a function of time.

FIG. 13 is a graphical representation of dimensional changes of the signal electrodes on the substrates J and L, as a function of time and shows a relation between type of inorganic films and change in pattern dimensions. As apparent from FIG. 13, the $SiN_x$ films (substrate L) also exhibit similar dimensional behaviors to those of the $SiO_2$ films (substrate J) and serve as the moisture barrier films. The water absorption of 0.5% or less can be maintained for a long period of time. Besides, films of $AlO_x$, $TiO_x$, and $ZrO_x$ also exhibit similar behaviors to that of the $SiN_x$ film. However, these films have a larger dielectric constant than the $SiO_2$ film, so that they are not suitable for the substrates of a liquid crystal display element.

EXAMPLE 13

In Example 13, the Example 11 was repeated to produce a substrate M except that the atmosphere in the heating step is anhydrous argon rather than the anhydrous air. An initial value of the dimension of 1,200 lines of the signal electrodes was measured. Thereafter, as in the Example 11, the dimensional change of the signal electrodes due to the heating/leaving cycle was measured.

COMPARATIVE EXAMPLE 8

As a comparative example to the Example 13, the Example 11 was repeated to produce a substrate N except that the atmosphere in the heating step was anhydrous oxygen rather than the anhydrous air. An initial value of the dimension of 1,200 lines of the signal electrodes was measured. Thereafter, as in the Example 11, the dimensional change of the signal electrodes due to the heating/leaving cycle was measured.

[Variations of Heating Ambient Gases, Effects on Substrates, and Dimensional Changes of Patterns]

Figure 14:
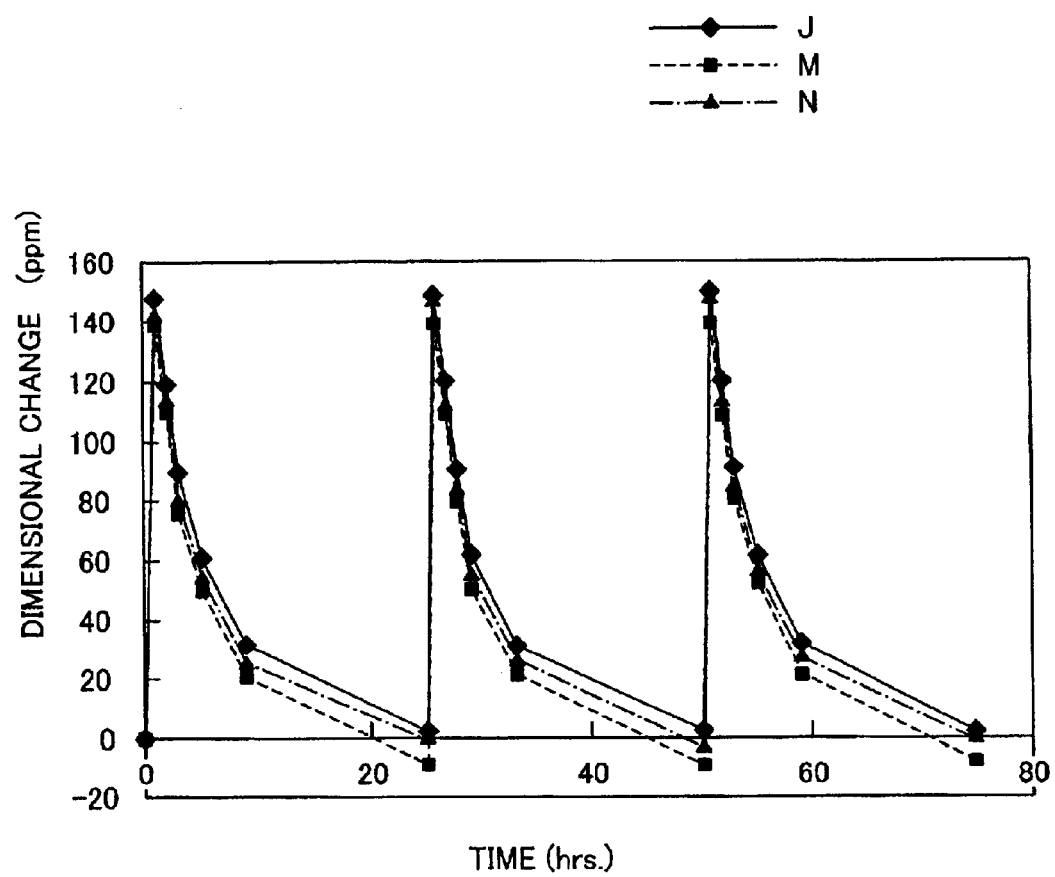
FIG. 14 is a graphical representation of dimensional changes of signal electrodes on substrates J, M, and N, as a function of time.

FIG. 14 is a graphical representation of dimensional changes of the signal electrodes on the substrates J, M, and N, as a function of time and shows a relation between variations of heating ambient gases and change in pattern dimensions. As apparent from FIG. 14, it is found that air (substrate J) is superior in dimensional behavior of the pattern. A possible reason would be that neither absorption nor release of the air under a normal atmosphere apparently occurs by the heating/leaving cycles. When the heating ambient gas is oxygen (substrate N) and air, coloring (yellowish) of the resin of the substrate by the heating was found. This was not found when argon was used (substrate M). This indicates that the substrate N is difficult to be used in steps for manufacturing liquid crystal display elements.

EXAMPLE 14)

In Example 14, the Example 11 was repeated to produce a substrate except that the atmosphere in the heating step is air having humidity of 35% rather than anhydrous air. An initial value of the dimension of 1,200 lines of the signal electrodes was measured. Thereafter, as in the Example 11, the dimensional change of the signal electrodes due to the heating/leaving cycle was measured.

COMPARATIVE EXAMPLE 9

As a comparative example to the Example 14, the Example 11 was repeated to produce a substrate P except that the atmosphere in the heating step is air having humidity of 40% rather than anhydrous air. An initial value of the dimension of 1,200 lines of the signal electrodes was measured. Thereafter, as in the Example 11, the dimensional change of the signal electrodes due to the heating/leaving cycle was measured.

[Relation Between Variations in Heating Ambient Humidity and Change in Pattern Dimensions]

Figure 15:
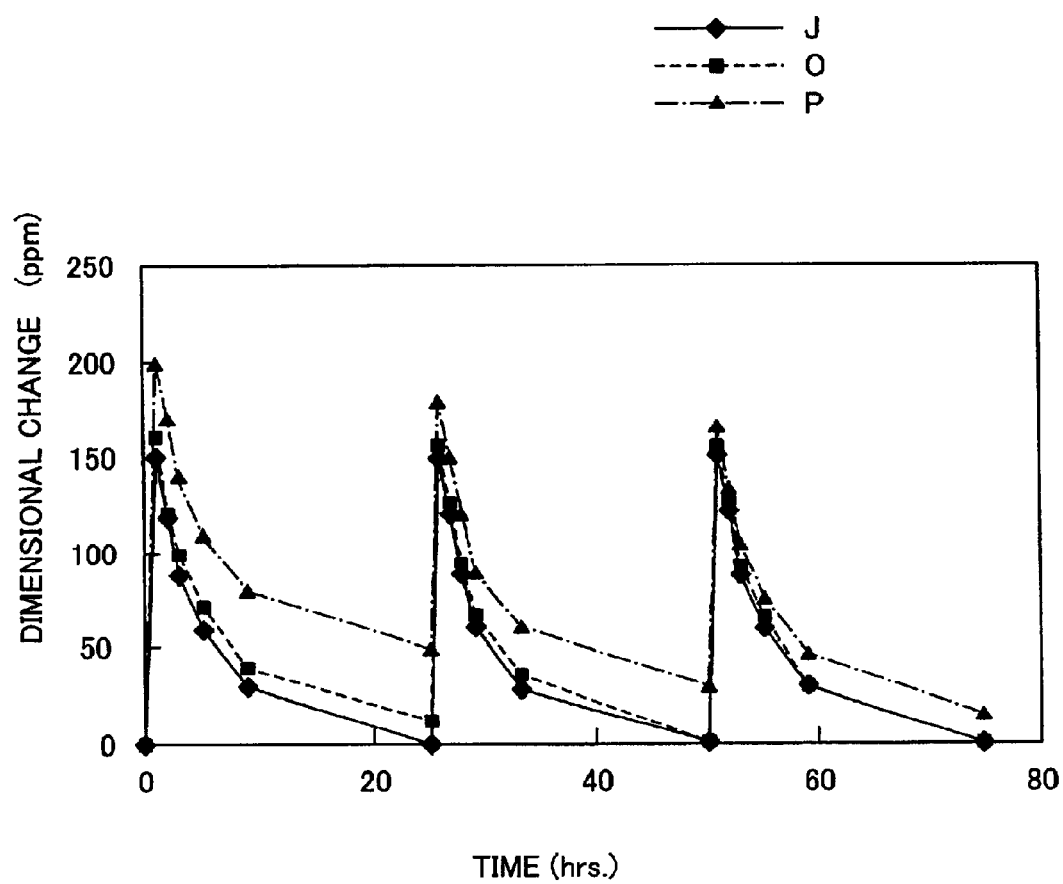
FIG. 15 is a graphical representation of dimensional changes of signal electrodes on substrates J, O, and P, as a function of time.

FIG. 15 is a graphical representation of dimensional changes of the signal electrodes on the substrates J, O, and P, as a function of time and shows a relation between variations in a heating ambient humidity and change in pattern dimensions. As apparent from FIG. 15, moisture is absorbed into a substrate in the heating step when the humidity exceeds 35% (substrate P), and it is found that a dimensional behavior varies (shrinks) during the subsequent heating/leaving cycles. This indicates that the substrate P is difficult to be used in manufacture steps in which variations in pattern dimensions should be not more than 20 ppm involving repeated heating of liquid crystal display elements.

EXAMPLE 15

In Example 15, a semi-completed color filter substrate was produced. More specifically, an epoxy resin sheet (sheet thickness of 0.4 mm) as a resin substrate was left for 1 hour at a room temperature under a reduced pressure of $1.33 \times 10^{-3}$ Pa. $SiO_2$ layers were formed to have a thickness of 20 nm by sputtering as the inorganic films on both surfaces of the resin substrate. It was then heated at 120° C. for 1 hour under a normal pressure in anhydrous air. Then, 400 pairs of color filters each consisting of sub-filters of R, G, and B were printed at 250 μm pitch (the sub-filters of R, G, and B were each 83.3 μm pitch) on the resin substrate in an ambient temperature to produce a substrate (semi-completed color filter substrate) Q. The dimension of 1,200 lines of the color filters was measured. Thereafter, as in the Example 9, the dimensional change of 1,200 lines of the color filters due to the heating/leaving cycle was measured.

COMPARATIVE EXAMPLE 10

As a comparative example to the Example 15, $SiO_2$ layers were formed to have a thickness of 20 nm by sputtering as the inorganic films on both surfaces of an epoxy resin sheet (sheet thickness of 0.4 mm) as a resin substrate. After that, the procedures as in the Example 15 were repeated to produce a substrate (semi-completed color filter substrate) R. The dimension of 1,200 lines of the color filters was measured. Thereafter, as in the Example 15, the dimensional change of 1,200 lines of the color filters due to the heating/leaving cycle was measured.

[Change in Pattern Dimensions of Color Filters]

Figure 16:
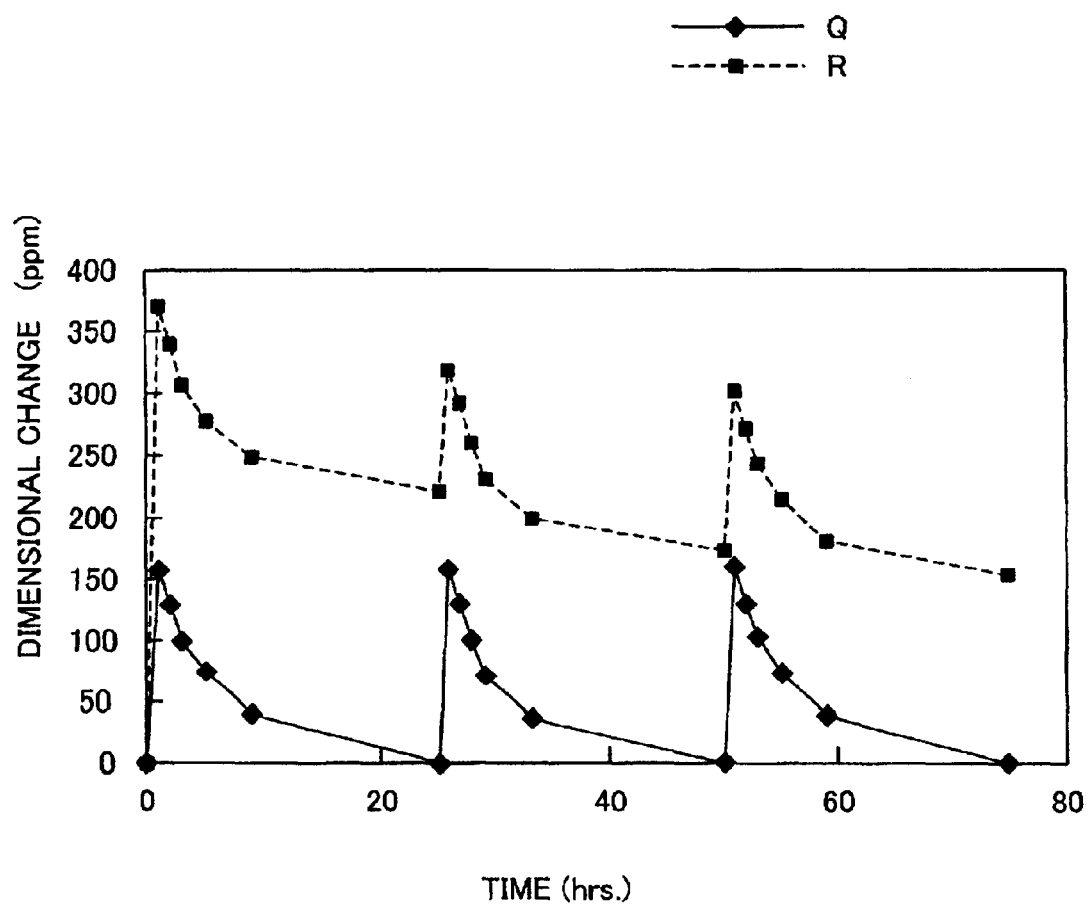
FIG. 16 is a graphical representation of dimensional changes of color filters on substrates Q and R, as a function of time.

FIG. 16 is a graphical representation of dimensional changes of the color filters on the substrates Q and R, as a function of time. In FIG. 16, the time "0" corresponds to a mask dimension. As shown in FIG. 16, it is indicated that both substrates expand due to the heating (of which dimensions enlarge). In particular, the substrate R expands to a large degree due to the heating and a dimensional behavior thereof varies (shrinks) for every heating/leaving cycle. On the contrary, it is found that no change in dimensional behavior occurs for every heating/leaving cycle in the substrate Q. Furthermore, the substrate Q expands to a lower degree by the heating and no dimensional behavior thereof for every heating/leaving cycle varies. This indicates that the substrate R is difficult to be used in manufacture steps involving repeated heating of liquid crystal display elements.

EXAMPLE 16

A flattening film layer was formed on the substrate Q of the Example 15, which was fired at 120° C. for 1 hour. The substrate Q was then left in anhydrous air for 24 hours. A transparent electrode film of ITO was formed on the substrate Q to have a thickness of 150 nm. A negative photoresist was applied to the transparent electrode film, which was dried at 120° C. for 5 minutes. The negative photoresist was exposed to light beams at an ambient temperature, with a striped mask (that has an unmask/mask space ratio of 80/20, a design value of 250 μm pitch) being set at right angles to the striped color filters. The resin substrate was subjected at a room temperature to development of the photoresist, etching of the transparent electrode films, and removal of the photoresist to form scanning electrodes. Thus, a color filter substrate S was produced. The dimension of 1,200 lines of the color filters was 100.0002 mm. The dimension of 400 lines of the scanning electrodes was 100.0005 mm.

The substrate J of the Example 11 was used as the opposing substrate. The dimension of 1,200 lines of the signal electrodes was 100.0007 mm.

Subsequently, spacers were applied to the opposing substrate J. A sealing material was printed on the color filter substrate S. The opposing substrate J and the color filter substrate S were bonded together so that the patterns of the signal electrodes on the opposing substrate J are matched to the patterns of the color filters on the color filter substrate S. The combination of the bonded substrates J and S was heated under a condition at 120° C. for 3 hours to cure the sealing material. In this way, a liquid crystal display element α was manufactured according to the method for manufacturing liquid crystal display elements of the present invention.

COMPARATIVE EXAMPLE 12

In Comparative Example 12, the procedures used to obtain the color filter substrate S of the Example 16 were repeated to form a color filter substrate T except that the substrate R of the Comparative Example 10 was used. The dimension of 1,200 lines of the color filters was 100.0152 mm. The dimension of 400 lines of the scanning electrodes was 100.0007 mm.

The substrate K of the Comparative Example 7 was used as the opposing substrate. The dimension of 1,200 lines of the signal electrodes was 100.0008 mm.

Subsequently, spacers were applied to the opposing substrate K. A sealing material was printed on the color filter substrate T. The opposing substrate K and the color filter substrate T were bonded together so that the patterns of the signal electrodes on the opposing substrate K are matched to the patterns of the color filters on the color filter substrate T. In this way, a liquid crystal display element β of the Comparative Example 12 was manufactured.

[Bonding Pattern Accuracy]

The dimension of 1,200 lines of the signal electrodes on the opposing substrate was compared with the dimension of 1,200 lines of the color filters on the color filter substrate. The minimum aperture ratio among all pixels was determined based on the misalignment of the patterns. The results are given in FIG. 17. As apparent from FIG. 17, the misalignment of the patterns and the aperture ratio indicate that the manufacture method of the present invention is superior in bonding pattern accuracy to the Comparative Example 12.

EXAMPLE 17

In Example 17, flexible terminals each having a line/space ratio of 80/10 were adhered at 1,200 lines/100 mm to 1,200 lines of the signal electrodes on the opposing substrate J and 1,200 lines of the scanning electrodes on the color filter substrate S of the liquid crystal display element α of the Example 16.

COMPARATIVE EXAMPLE 13

In Comparative Example 13, flexible terminals each having a line/space ratio of 80/10 were adhered at 1,200 lines/100 mm to 1,200 lines of the signal electrodes on the opposing substrate K and 1,200 lines of the scanning electrodes on the color filter substrate T of the liquid crystal display element β of the Comparative Example 12.

[Pattern Accuracy of Flexible Terminals]

The dimension of 1,200 lines of the flexible terminals was compared with the dimensions of 1,200 lines of the signal electrodes on the liquid crystal display element (opposing substrate) to determine the misalignment of patterns. In addition, the contact ratio between the signal electrodes and the flexible terminals was compared. The results are given in FIG. 18. As apparent from FIGS. 10 and 11, the misalignment of the patterns and the contact ratio indicate that the manufacture method of the present invention is superior in bonding pattern accuracy to the Comparative Example 13. It is noted that the adjacent lines do not contact with each other because of the space dimension of maximum 16 μm. However, the adjacent lines may contact with each other in the Comparative Example 13 when the space dimension is reduced to achieve high-definitions.

Embodiment 3

The embodiment 3 of the present invention illustrates a case where reset is included in the manufacture steps.

Figure 19:
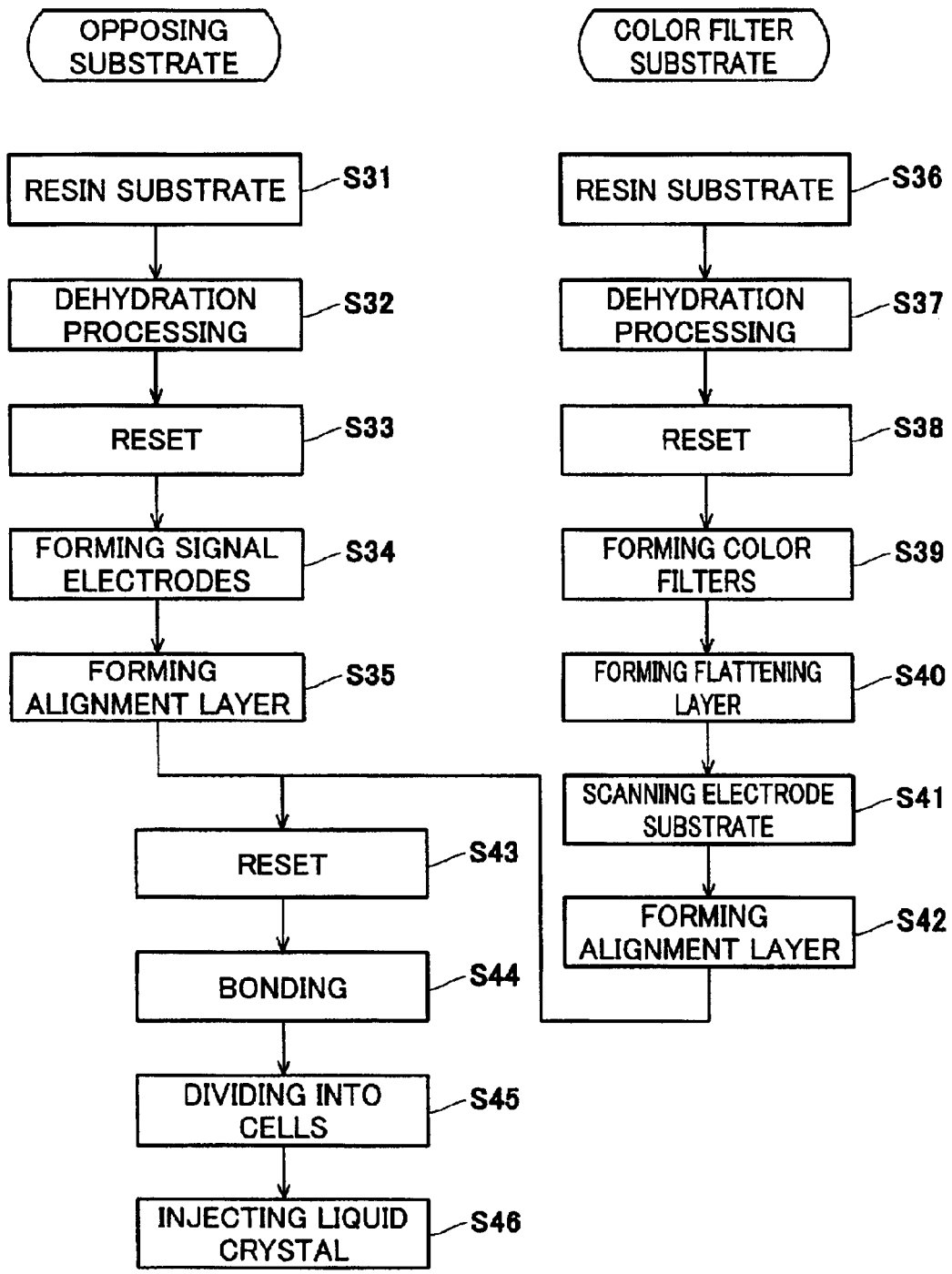
FIG. 19 is a flow chart illustrating an outline of a method for 0.5 manufacturing a liquid crystal display element according to the Embodiment 2 of the present invention.

FIG. 19 is a flow chart illustrating a method for manufacturing a liquid crystal display element according to the present embodiment.

As shown in FIG. 19, method for manufacturing the liquid crystal display element according to the present embodiment is different from the Embodiment 1 in that reset steps (step S33, S38, and S43) which are characteristic features of the present invention are included before a signal electrode forming step (step S34), a color filter forming step (step S39), and a bonding step (step S44). Other components and features are similar to those in the Embodiment 1.

Referring to FIGS. 1 and 19, in this embodiment, the resin substrates 1A and 1B are dehydrated and the inorganic films 2 are then formed on both surfaces of the resin substrates in the steps for manufacturing the opposing substrate 101 and the color filter substrate 102. The reset step is a step for dehydrating the semi-processed resin substrates 1A and 1B. The dehydration may be achieved by drying (heating) described in the Embodiment 1. Alternatively, the dehydration may be achieved by reducing the pressure as described in the Embodiment 2. As to the degree of dehydration, it is preferable that the resin substrates 1A and 1B be dehydrated to achieve the water absorption of 0.5% or less by weight. This makes the shrinkage significantly small even when the resin substrates 1A and 1B are subjected to heating.

Figure 20:
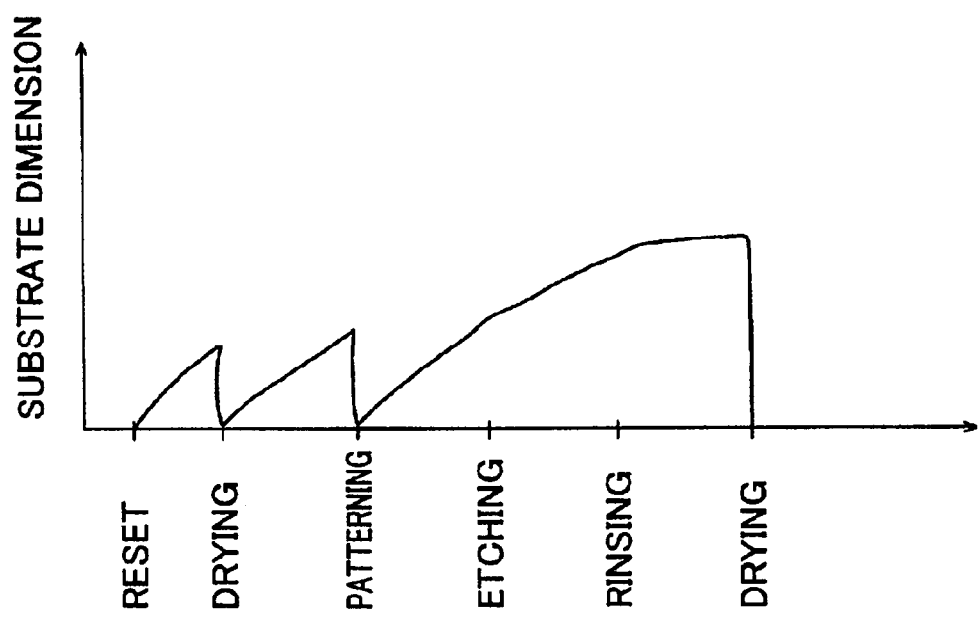
FIG. 20 is a graphical representation that schematically illustrates values of dimensional change observed in a step of depositing a film on a substrate after reset.

Next, effects of the reset step are described. FIG. 20 is a graphical representation that schematically illustrates dimensional changes observed in a step of depositing a film on a substrate after the reset. Referring to FIGS. 1 and 20, manufacture of liquid crystal display elements is performed in a clean room that is maintained in a predetermined atmosphere. For example, the reset is carried out first when the signal electrode forming step is required. The reset is carried out by means of, for example, heating the resin substrate 1A at 120° C. for 72 hours. This reduces the water absorption into the resin substrate 1A to 0.1% or less by weight, as described in the Embodiment 1. The resin substrate 1A is shrinked to the limit in this reset step. Subsequently, the resin substrate 1A is subjected to processing of drying, patterning, etching, rinsing, and drying. During the processing, the resin substrate 1A swells gradually from the reset to the drying due to the moisture absorption. It shrinks to an approximately original dimension by the drying. Thereafter, the resin substrate 1A swells gradually from the drying to the patterning due to the moisture absorption, and shrinks to an approximately original dimension by the patterning. Then, the resin substrate 1A swells due to the moisture absorption from the patterning to the drying through the etching and the rinsing. However, it shrinks to an approximately original dimension by the drying. In this event, the dimension of the signal electrodes is determined by the etching. The atmosphere in the clean room is maintained under predetermined conditions, so that it is possible to estimate the amount of swelling of the resin substrate 1A from the reset to the completion of the etching. Accordingly, the dimension of the signal electrodes can be controlled with high accuracy. This also applies to the deposition step for the color filter substrate. As to the bonding step, the opposing substrate and the color filter substrate to be bonded together have different processing histories. The dimensions of these substrates vary relatively significantly by the heating that is required to cure the sealing material when the substrates are bonded without any further processing. The variation in dimension leads to a relatively large misalignment of the patterns. On the other hand, when the reset is carried out before the bonding step as is done in the present embodiment, the substrates have the dimensions depending on the reset conditions, regardless of the processing histories. Accordingly, it becomes possible to estimate the dimensional changes of the substrate due to the heating that is required to cure the sealing material, which in turn makes it possible to reduce misalignment of the patterns after the bonding.

In the descriptions of the Embodiment 3, the inorganic films 2 are formed on both surfaces of the resin substrate 1A and 1B. However, the inorganic films 2 may be formed on one surface of the resin substrates 1A and 1B. Alternatively, the inorganic film may be omitted. In such cases, it should be noted, however, that the rate of the moisture absorption into the resin substrates 1A and 1B becomes high. Therefore, it is necessary to carry out the subsequent steps as soon as possible after the reset.

The present invention can equally be applied to a method for manufacturing active matrix liquid crystal display elements.

It also can equally be applied to a method for manufacturing other image display elements such as organic electroluminescent display elements.

Numerous modifications and alternative embodiment of the invention will be apparent to those skilled in the art in vie of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A method for manufacturing an image display element having a resin substrate that holds a display functional portion on which images are displayed, characterized by comprising:

an inorganic film forming step of forming inorganic films on both surfaces of the resin substrate, wherein the inorganic films having a film thickness between 15 nm and 40 nm both inclusive serve as a moisture barrier film, and a dehydration step of dehydrating the resin substrate before or after the inorganic film forming step, wherein the resin substrate is dehydrated in the dehydration step so that the water absorrnion is 0.5% or less by weight, the resin substrate subjected to the inorganic film forming step and the dehydration step and an other substrate are bonded to each other by a sealing material, and then the sealing material is cured by heating at least the resin substrate.

2. A method for manufacturing an image display element as claimed in claim 1, wherein the display functional portion is interposed between the resin substrate and the other substrate.

3. A method for manufacturing an image display element as claimed in claim 2, wherein the other substrate has a color filter.

4. A method for manufacturing an image display element as claimed in claim 3, wherein the color filter comprises subfilters which are color filters corresponding to red, green and blue.

5. A method for manufacturing an image display element as claimed in claim 4, wherein the color filter is adapted to selectively pass a light having predetermined wave length included in incident white light therethrough.

6. A method for manufacturing an image display element as claimed in claim 1, the inorganic film forming step is carried out after the dehydration step.

7. A method for manufacturing an image display element as claimed in claim 1, wherein the dehydration step is carried out after the inorganic film forming step.

8. A method for manufacturing an image display element as claimed in claim 1, wherein the resin substrate is formed of, at least one of epoxy, acryl, polyimide, polycarbonate, polyvinyl alcohol, and polyethylene, composites thereof, or laminated resin materials thereof.

9. A method for manufacturing an image display element as claimed in claim 1, wherein the inorganic film comprises a film of any one of $SiO_x$, $SiN_x$, $GeO_x$, $TiO_x$, and $ZrO_x$, a composite film thereof or a laminated film thereof.

10. A method for manufacturing an image display element as claimed in claim 1, wherein the resin substrate is dehydrated by means of heating.

11. A method for manufacturing an image display element as claimed in claim 10, wherein a temperature during the heating is 200° C. or less.

12. A method for manufacturing an image display element as claimed in claim 1, wherein the resin substrate is dehydrated by pressure reduction.

13. A method for manufacturing an image display element as claimed in claim 12, wherein the resin substrate is heated after the pressure reduction of the resin substrate.

14. A method for manufacturing an image display element as claimed in claim 13, wherein a temperature during the heating is 200° C. or less.

15. A method for manufacturing an image display element as claimed in claim 13, in an atmosphere of the heating is an inert gas.

16. A method for manufacturing an image display element as claimed in claim 13, wherein an atmosphere of the heating is air.

17. A method for manufacturing an image display element as claimed in claim 13, wherein a humidity of the atmosphere of the heating is 35% or less.

18. A method for manufacturing an image display element as claimed in claim 1, wherein a predetermined film is formed on one of the inorganic films of the resin substrate and the predetermined film is patterned after the resin substrate is subjected to the inorganic film forming step and the dehydration step.

19. A method for manufacturing an image display element as claimed in claim 18, wherein the predetermined film is a transparent electrode film.

20. A method for manufacturing an image display element as claimed in claim 18, wherein the predetermined film is a color filter film.

21. A method for manufacturing an image display element as claimed in claim 18, wherein the image display element is a liquid crystal display element, the liquid crystal display element has the resin substrate as the other substrate, and patterns of the predetermined film are formed on the resin substrate.

22. A method for manufacturing an image display element as claimed in claim 19, wherein a flexible terminal is adhered to the transparent electrode formed by means of patterning the transparent electrode film.

23. A method for manufacturing an image display element having a resin substrate that holds a display functional portion on which images are displayed, characterized by comprising a reset step of dehydrating the resin substrate so that the water absorption thereof is 0.5% or less by weight.

24. A method for manufacturing an image display element as claimed in claim 23, further comprising an inorganic film forming step of forming inorganic films on both surfaces of the resin substrate before the reset step.

* * * * *

UNITED STATES PATENT AND TRADEMARK OFFICE
CERTIFICATE OF CORRECTION

PATENT NO. : 6,786,790 B2
DATED : September 7, 2004
INVENTOR(S) : Takaiki Nomura et al.

It is certified that error appears in the above-identified patent and that said Letters Patent is hereby corrected as shown below:

Column 24,
Line 29, change "in an atmosphere" to -- wherein an atmosphere --.

Signed and Sealed this

Twelfth Day of July, 2005

JON W. DUDAS
*Director of the United States Patent and Trademark Office*